US008416989B2

(12) United States Patent
Hirasawa

(10) Patent No.: US 8,416,989 B2
(45) Date of Patent: Apr. 9, 2013

(54) IMAGE PROCESSING APPARATUS, IMAGE CAPTURE APPARATUS, IMAGE PROCESSING METHOD, AND PROGRAM

(75) Inventor: Yasutaka Hirasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 12/839,347

(22) Filed: Jul. 19, 2010

(65) Prior Publication Data

US 2011/0026834 A1    Feb. 3, 2011

(30) Foreign Application Priority Data

Jul. 29, 2009    (JP) .............................. P2009-176085

(51) Int. Cl.
*G06K 9/00*    (2006.01)
(52) U.S. Cl.
USPC .......................................... 382/103; 348/169
(58) Field of Classification Search .................. 382/100, 382/173, 181, 190, 195, 206, 218, 219, 294, 382/298, 299; 348/169–172
See application file for complete search history.

(56) References Cited

U.S. PATENT DOCUMENTS

| | | | |
|---|---|---|---|
| 5,048,095 A * | 9/1991 | Bhanu et al. ................... | 382/173 |
| 6,263,088 B1 * | 7/2001 | Crabtree et al. ............... | 382/103 |
| 6,785,427 B1 * | 8/2004 | Zhou .............................. | 382/294 |
| 6,819,797 B1 * | 11/2004 | Smith et al. ..................... | 382/181 |
| 6,985,623 B2 * | 1/2006 | Prakash et al. ................. | 382/173 |
| 7,397,970 B2 * | 7/2008 | Han et al. ....................... | 382/281 |
| 7,702,183 B1 * | 4/2010 | Johnson et al. ................ | 382/294 |
| 2010/0272357 A1 * | 10/2010 | Maxwell et al. ............... | 382/173 |
| 2012/0002880 A1 * | 1/2012 | Lipson et al. .................. | 382/195 |

FOREIGN PATENT DOCUMENTS

| | | |
|---|---|---|
| JP | 07-103734 | 4/1995 |
| JP | 2003-085566 | 3/2003 |

OTHER PUBLICATIONS

Extended European Search Report mailed by the European Patent Office on Jun. 5, 2012, in European Patent Application No. 10168702.8.
Falkenhagen, "Hierarchical Block-Based Disparity Estimation Considering Neighbourhood Constraints," Proc. International Workshop on SNHC and 3D Imaging, pp. 115-122, (Rhodes, Greece), 1997.
Forstmann et al., "Real-Time Stereo by using Dynamic Programming," Proceedings of the 2004 IEEE Computer Society Conference on Computer Vision and Pattern Recognition Workshop.

(Continued)

*Primary Examiner* — Anand Bhatnagar
(74) *Attorney, Agent, or Firm* — Finnegan, Henderson, Farabow, Garrett & Dunner, L.L.P.

(57) ABSTRACT

An image processing apparatus includes the following elements. First and second images are photographed from different points of view. A block division unit divides the first image into blocks. A similarity calculation unit calculates similarities between blocks in the first image and image regions in the second image. A likelihood calculation unit calculates likelihoods of each candidate corresponding image region in the second image with respect to individual sets of adjacent blocks in the first image on the basis of a positional relationship of the candidate corresponding image region. A corresponding position determination unit determines evaluation values of each candidate corresponding image region in the second image with respect to the blocks in the first image using the calculated similarities and likelihoods, and determines an image region in the second image corresponding to each of the blocks in the first image by comparing the determined evaluation values.

15 Claims, 18 Drawing Sheets

OTHER PUBLICATIONS

Tzovaras et al., "Evaluation of multiresolution block matching techniques for motion and disparity estimation," Signal Processing: Image Communication 6:59-67 (1994).

Van Meerbergen et al., "A Hierarchical Symmetric Stereo Algorithm Using Dynamic Programming," Int. J. Computer Vision 47:275-285 (2002).

Zhang, "Hierarchical Block-Based Disparity Estimation Using Mean Absolute Difference and Dynamic Programming," International Workshop on Very Low Bitrate Video Coding (VLBV01), Athens, Greece, Oct. 2001.

\* cited by examiner

FIG. 2
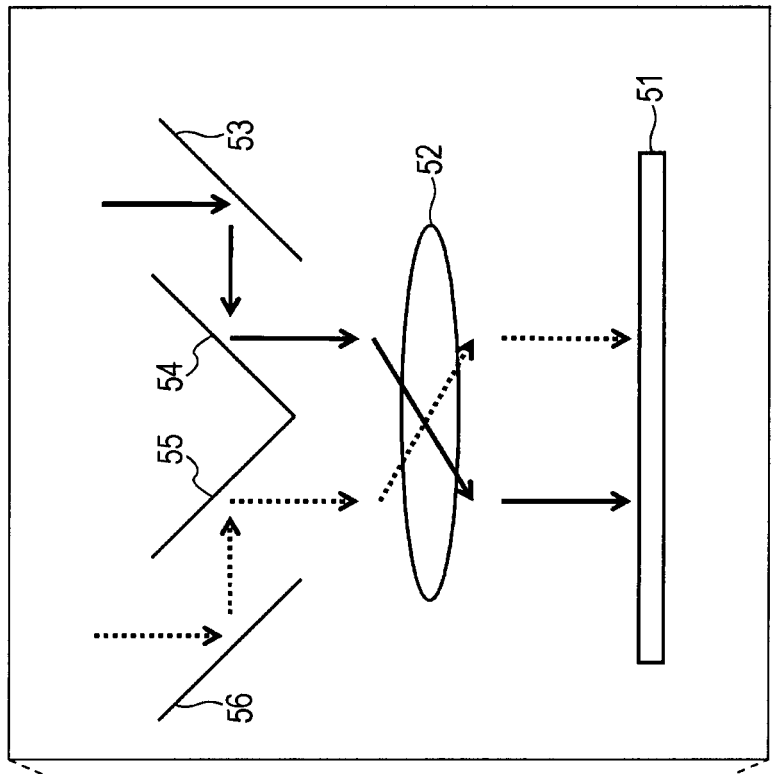
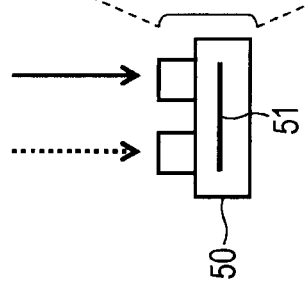

FIG. 15

| A | B | C | D | E | |
|---|---|---|---|---|---|
|   |   |   | 3 | 5 | 19 |
|   |   |   | 3 | 7 | 18 |
|   |   |   | 6 | 3 | 17 |
|   |   |   | 9 | 3 | 16 |
|   |   | 1 | 1 |   | 15 |
|   |   | 2 | 1 |   | 14 |
|   |   | 1 | 2 |   | 13 |
|   |   | 3 | 1 |   | 12 |
|   | 10 (7) | 4 |   |   | 11 |
|   | 8 (7) | 5 |   |   | 10 |
|   | 6 (2) | 2 |   |   | 9 |
|   | 4 (2) | 2 |   |   | 8 |
| 2 | 5 (2) |   |   |   | 7 |
| 6 | 5 (2) |   |   |   | 6 |
| 7 | 7 (2) |   |   |   | 5 |
| 4 | 8 (0) |   |   |   | 4 |
| 5 |   |   |   |   | 3 |
| 1 |   |   |   |   | 2 |
| 3 |   |   |   |   | 1 |
| 2 |   |   |   |   | 0 |

400

402

| A | B | C | D | E |
|---|---|---|---|---|

IMAGE PROCESSING APPARATUS, IMAGE CAPTURE APPARATUS, IMAGE PROCESSING METHOD, AND PROGRAM

BACKGROUND OF THE INVENTION

1. Field of the Invention

The present invention relates to an image processing apparatus, an image capture apparatus, an image processing method, and a program. More specifically, the present invention relates to an image processing apparatus, an image capture apparatus, an image processing method, and a program for determining corresponding points between a plurality of images photographed from different points of view.

2. Description of the Related Art

Corresponding points between images photographed from a plurality of different points of view may be searched for to calculate the distance of objects appearing in the images from cameras. Many techniques for accurately and quickly searching for corresponding points between images have been proposed.

For example, Japanese Unexamined Patent Application Publication No. 2003-085566 discloses a technique for determining correspondences between images with high accuracy. In the disclosed technique, optimum correspondences are assigned to pixel sequences on horizontal scanning lines using the Viterbi algorithm, which is a dynamic programming algorithm.

Japanese Unexamined Patent Application Publication No. 07-103734 discloses a technique for quickly determining correspondences between images. In the disclosed technique, images that are reduced in size are used to form a layered structure in which results of correspondence detection in low-resolution layers are transferred to higher-resolution layers to reduce the amount of correspondence search processing in high-resolution layers.

SUMMARY OF THE INVENTION

As described above, some examples of related art disclose configurations for accurately or quickly calculating corresponding points between images photographed from a plurality of points of view. However, such configurations have difficulties. For example, in the process disclosed in Japanese Unexamined Patent Application Publication No. 2003-085566 above, the calculation of correspondences of individual pixels forming an image involves a large amount of computation processing. Further, in the process disclosed in Japanese Unexamined Patent Application Publication No. 07-103734 above, the block size that is used to search for correspondences in layers is fixed regardless of the layer. Thus, the block size used to search for correspondences in low-resolution layers may be large relative to the size of the image.

It is therefore desirable to propose a technique for taking corresponding point measurements with improved accuracy and speed.

Exemplary embodiments of the present invention provide, for example, an image processing apparatus, an image capture apparatus, an image processing method, and a program. In the exemplary embodiments, an image is divided into blocks, and evaluation values obtained from corresponding positions for block sequences in the horizontal direction are optimized. Further, the image is reduced in size, and results of correspondence detection in a low-resolution image are obtained. In this process, the block size is also reduced in accordance with the reduction ratio of the image. This process enables high-speed and high-accuracy detection of correspondences between images.

An embodiment of the present invention provides an image processing apparatus including a block division unit configured to perform a block division process on a first image selected from the first image and a second image, the first image and the second image being images photographed from different points of view, a similarity calculation unit configured to calculate similarities between blocks in the first image that are defined by the block division unit and image regions that form the second image, a likelihood calculation unit configured to calculate likelihoods of each candidate corresponding image region in the second image with respect to individual sets of adjacent blocks in the first image, the calculation being based on a positional relationship of the candidate corresponding image region, and a corresponding position determination unit configured to determine evaluation values of each candidate corresponding image region in the second image with respect to the blocks in the first image using similarities calculated by the similarity calculation unit and likelihoods calculated by the likelihood calculation unit and to determine image regions in the second image that correspond to the blocks in the first image by comparing the determined evaluation values.

The image processing apparatus may further include an image size reduction unit configured to reduce a size of the first image and a size of the second image to generate a first size-reduced image and a second size-reduced image. The block division unit, the similarity calculation unit, the likelihood calculation unit, and the corresponding position determination unit may execute a process on the first size-reduced image and the second size-reduced image generated by the image size reduction unit to determine corresponding image regions in the second size-reduced image that correspond to blocks in the first size-reduced image. When the block division unit, the similarity calculation unit, the likelihood calculation unit, and the corresponding position determination unit execute a process on the first image and the second image that have not been reduced in size to determine corresponding image regions in the second image that correspond to the blocks in the first image, the corresponding position determination unit may execute a process for setting only a corresponding image region in the second image that is not reduced in size, which corresponds to a corresponding image region determined for the second size-reduced image, as a candidate corresponding image region for which an evaluation value is calculated.

The image size reduction unit may generate size-reduced images having different reduction ratios. The block division unit, the similarity calculation unit, the likelihood calculation unit, and the corresponding position determination unit may execute a process as a preceding image process on a size-reduced image having a high reduction ratio, and may execute a process as a subsequent image process on a size-reduced image having a low reduction ratio or on an image that is not reduced in size. In the subsequent image process, a process for defining a candidate corresponding image region for which an evaluation value is calculated may be performed based on a corresponding image region in the second size-reduced image that is determined in the preceding image process, the second size-reduced image having a high reduction ratio.

The block division unit may perform a block division process on the size-reduced images to divide the size-reduced images into blocks using block sizes that are reduced at a reduction ratio that is identical to the reduction ratios of the size-reduced images.

The likelihood calculation unit may calculate likelihoods of a first candidate image region and a second candidate image region in the second image with respect to a first block and a second block included in adjacent blocks in the first image, respectively, by setting the likelihoods so that the likelihoods are reduced in accordance with an increase in distance between the first candidate image region and the second candidate image region in the second image when the first candidate image region and the second candidate image region are apart from each other, and by setting the likelihoods so that the likelihoods are reduced in accordance with an increase in overlap between the first candidate image region and the second candidate image region in the second image when the first candidate image region and the second candidate image region overlap.

The corresponding position determination unit may calculate an evaluation value X using a similarity F calculated by the similarity calculation unit and a likelihood H calculated by the likelihood calculation unit in accordance with an expression $$X = F + \lambda H$$

where $\lambda$, denotes a predetermined coefficient.

The corresponding position determination unit may calculate an evaluation value for a set of a plurality of blocks defined in the first image using the expression, and determine a corresponding image region in the second image that corresponds to the set of the plurality of blocks defined in the first image using the calculated evaluation value.

The corresponding position determination unit may determine corresponding image region in the second image that correspond to the blocks in the first image by comparing the evaluation values, by using dynamic programming.

Another embodiment of the present invention provides an image capture apparatus including the image processing apparatus described above.

Still another embodiment of the present invention provides an image processing method executed in an image processing apparatus, including the steps of performing, by a block division unit, a block division process on a first image selected from the first image and a second image, the first image and the second image being images photographed from different points of view; calculating, by a similarity calculation unit, similarities between blocks in the first image that are defined in the step of performing a block division process and image regions that form the second image; calculating, by a likelihood calculation unit, likelihoods of each candidate corresponding image region in the second image with respect to individual sets of adjacent blocks in the first image, the calculation being based on a positional relationship of the candidate corresponding image region; and determining, by a corresponding position determination unit, evaluation values of each candidate corresponding image region in the second image with respect to the blocks in the first image using similarities calculated by the similarity calculation unit and likelihoods calculated by the likelihood calculation unit, and determining image regions in the second image that correspond to the blocks in the first image by comparing the determined evaluation values.

Still another embodiment of the present invention provides a program for causing an image processing apparatus to execute an image process, including the steps of causing a block division unit to perform a block division process on a first image selected from the first image and a second image, the first image and the second image being images photographed from different points of view; causing a similarity calculation unit to calculate similarities between blocks in the first image that are defined in the step of causing the block division unit to perform a block division process and image regions that form the second image; causing a likelihood calculation unit to calculate likelihoods of each candidate corresponding image region in the second image with respect to individual sets of adjacent blocks in the first image, the calculation being based on a positional relationship of the candidate corresponding image region; and causing a corresponding position determination unit to determine evaluation values of each candidate corresponding image region in the second image with respect to the blocks in the first image using similarities calculated by the similarity calculation unit and likelihoods calculated by the likelihood calculation unit and to determine image regions in the second image that correspond to the blocks in the first image by comparing the determined evaluation values.

The program according to the embodiment of the present invention may be, for example, a program that can be provided to an image processing apparatus or a computer system capable of executing various program codes in computer-readable form using a storage medium or a communication medium. The image processing apparatus or the computer system to which such a program is provided in computer-readable form executes processing according to the program.

Further features and advantages of embodiments of the present invention will become apparent from the more detailed description of the following exemplary embodiments of the present invention taken in conjunction with the accompanying drawings. The term "system", as used herein, refers to a logical set of apparatuses regardless of whether or not apparatuses having individual structures are housed in a single housing.

According to a configuration of an exemplary embodiment of the present invention, efficient detection of corresponding points between a plurality of images photographed from a plurality of different points of view can be achieved. Specifically, an L image among the L image and an R image, which are images photographed from different points of view, is divided into blocks, and similarities between the blocks in the L image and image regions that form the R image are calculated. Then, likelihoods of each candidate corresponding image region in the R image with respect to individual sets of adjacent blocks in the L image are determined on the basis of the positional relationship of the candidate corresponding image region. Further, evaluation values of each candidate corresponding image region in the R image with respect to the blocks in the L image are determined using similarities and likelihoods, and the determined evaluation values are compared to determine image regions in the R image that correspond to the blocks in the L image. In addition, processing using size-reduced images or processing using dynamic programming allows higher-speed processing.

BRIEF DESCRIPTION OF THE DRAWINGS

FIG. 2 is a diagram illustrating an example configuration of a camera with which images are photographed from different points of view at the same time;

FIG. 15 is a diagram illustrating an example process of stereo matching using dynamic programming;

DESCRIPTION OF THE PREFERRED EMBODIMENTS

An image processing apparatus, an image capture apparatus, an image processing method, and a program according to embodiments of the present invention will be described in detail with reference to the drawings. The description will be given in the following items:

1. Image Processing Apparatus according to First Exemplary Embodiment

2. Example Configuration of Image Processing Apparatus that Implements High-Speed Processing (Second Exemplary Embodiment)

3. Image Capture Apparatus according to Exemplary Embodiment

1. Image Processing Apparatus According to First Exemplary Embodiment

Figure 1:
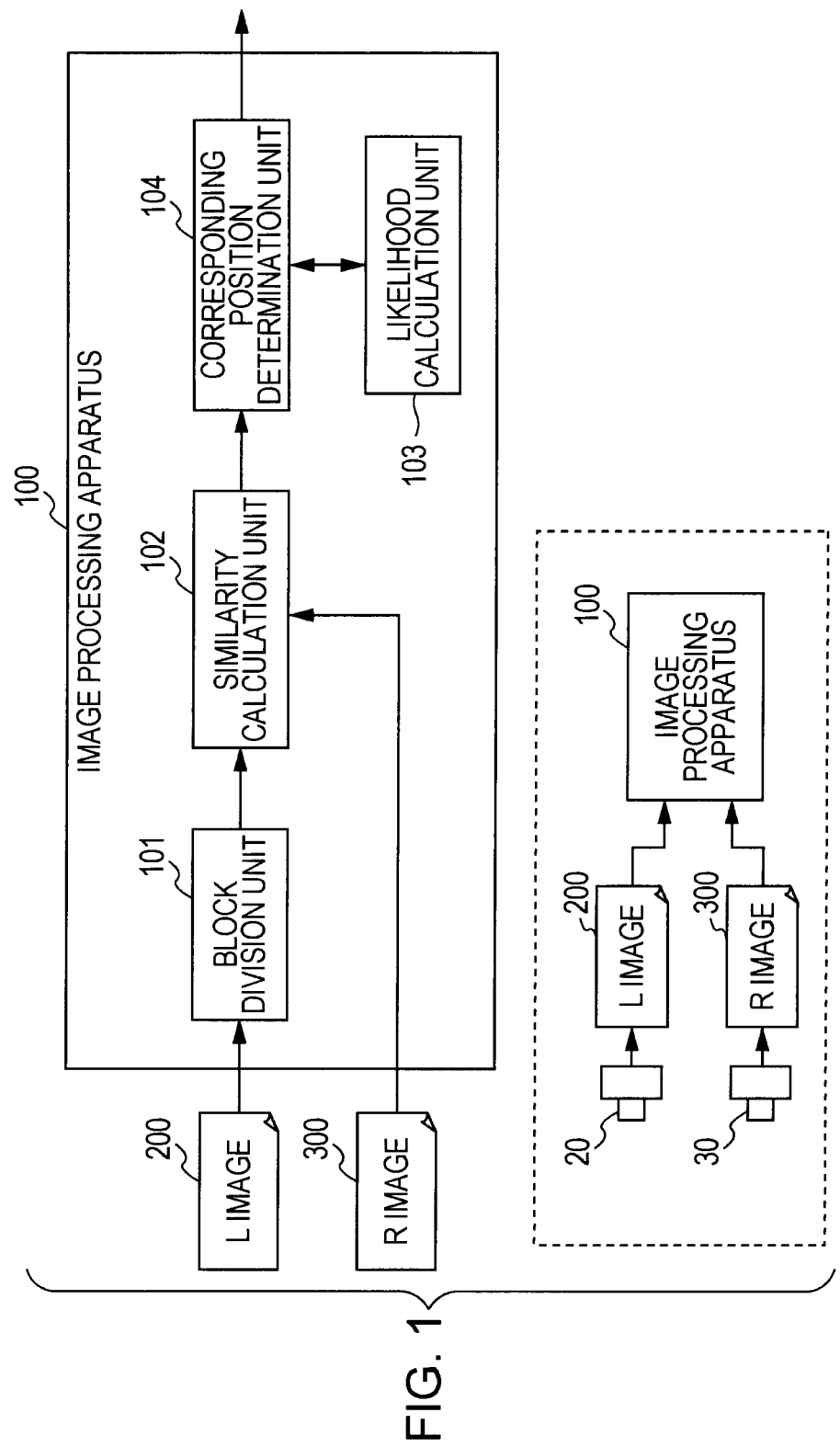
FIG. 1 is a diagram illustrating an example configuration of an image processing apparatus according to an exemplary embodiment of the present invention.

An image processing apparatus according to a first exemplary embodiment of the present invention will be described with reference to the drawings. FIG. 1 illustrates an example configuration of an image processing apparatus 100 according to the first exemplary embodiment of the present invention. A plurality of images photographed from different points of view are input to the image processing apparatus 100 illustrated in FIG. 1. In the following description of exemplary embodiments, the input images may be an L image 200 and an R image 300. The image processing apparatus 100 determines the position in the R image 300 which corresponds to each of blocks into which image regions that form the L image 200 are divided. That is, a process for determining corresponding points between images is performed.

For example, the L image 200 may be an image obtained from one of two cameras placed in parallel, and the R image 300 may be an image obtained from the other camera. As illustrated in a correlation diagram between the cameras and the input images in the lower part of FIG. 1, the L image 200 and the R image 300 are images photographed from different points of view using two cameras 20 and 30 that are placed in parallel, respectively.

When two cameras are placed completely in parallel, corresponding positions of a certain block in the vertical direction are generally the same in both images photographed using the two cameras. Thus, the corresponding position search may be performed only in the horizontal direction. When the cameras are not placed in parallel, it is assumed that the L image 200 and the R image 300 have been subjected to an image modification correction process, or rectification. Rectification is an image correction process for modifying images obtained using two cameras that are not placed in parallel into images similar to those obtained using cameras that are placed in parallel. Through rectification, the search direction of corresponding positions can be limited to the horizontal direction.

Note that the L image 200 and the R image 300 may not necessarily be images captured using a plurality of cameras. For example, two images may be obtained using a single camera by, after photographing one of the images, moving the camera to change the point of view and photographing the other image. The obtained images may be used as the L image 200 and the R image 300.

Alternatively, with the use of mirrors or the like, images may be obtained at the same time from a plurality of points of view using a single camera. The obtained images may also be used. An example configuration for obtaining images at the same time from a plurality of points of view using a single camera will be described with reference to FIG. 2. Referring to FIG. 2, a camera 50 has two separate imaging paths (indicated by solid lines and dotted lines), and a single imaging element 51.

As illustrated in the internal configuration of the camera 50 in the right part of FIG. 2, mirrors 53 to 56 placed in front of an optical system 52 allow a user to obtain images from a plurality of points of view using the single imaging element 51. With the use of the mirrors 53 to 56 placed before the imaging element 51 and the optical system 52, light from different points of view, as indicated by solid line arrows and dotted line arrows, can be obtained using the single imaging element 51.

The L image 200 and the R image 300 in the configuration illustrated in FIG. 1 may be images photographed in the manner described above using a single camera or images photographed using a plurality of cameras. The L image 200 and the R image 300 may also be images photographed using a single camera by moving the camera.

An overview of a process executed by the image processing apparatus 100 illustrated in FIG. 1 will be described.

A block division unit 101 divides the L image 200 into blocks. The image processing apparatus 100 determines which position in the R image 300 each block defined in the L image 200 corresponds to. A region (search range) within which a position in the R image 300 corresponding to one block in the L image 200 is searched for may be an entire range of the R image 300, or a limited region corresponding to each block may be defined in advance. A specific example of determining a search range will be described below.

A similarity calculation unit 102 individually calculates similarities between each block in the L image 200, which is defined by the block division unit 101, and all candidate corresponding positions (candidate corresponding blocks) that can be defined in the search range defined in the R image 300.

A likelihood calculation unit 103 defines adjacent block sets each including a plurality of adjacent blocks in the L image 200, and calculates a likelihood of the corresponding block sets defined in the R image 300 for each adjacent block set defined in the L image 200.

For example, two horizontally adjacent blocks (blocks La and Lb) in the L image 200 are used as a block set, and individual candidate corresponding positions (blocks Ra and Rb) to the blocks La and Lb in the L image 200 are defined in the R image 300.

The likelihood calculation unit 103 calculates a likelihood of the candidate corresponding positions (blocks Ra and Rb) defined in the R image 300. Specifically, when the blocks La and Lb in the L image 200 are horizontally adjacent, the likelihood is high if the corresponding candidate positions (blocks Ra and Rb) in the R image 300 are horizontally adjacent. If the corresponding candidate positions (blocks Ra and Rb) in the R image 300 are not horizontally adjacent but are spaced apart or overlap, the likelihood is low.

In this manner, the likelihood calculation unit 103 performs likelihood calculation in units of block sets. The likelihood calculation unit 103 calculates the likelihood of a corresponding position defined in the R image 300 with respect to a block set defined in the L image 200, and performs the above calculation on all the combinations of candidate corresponding positions that can be defined in the search range described above.

A corresponding position determination unit 104 determines a corresponding position having an optimum evaluation value from among candidate corresponding positions, and assigns the corresponding position to each block. Evaluation values are calculated on the basis of the likelihoods obtained from the likelihood calculation unit 103 and the similarities obtained from the similarity calculation unit 102.

The processes executed by the individual constituent elements will now be described in detail. In the image processing apparatus 100, first, the block division unit 101 divides the L image 200 into blocks. The size of the obtained blocks may be, for example, 4×4 pixels or 8×8 pixels.

Figure 3:
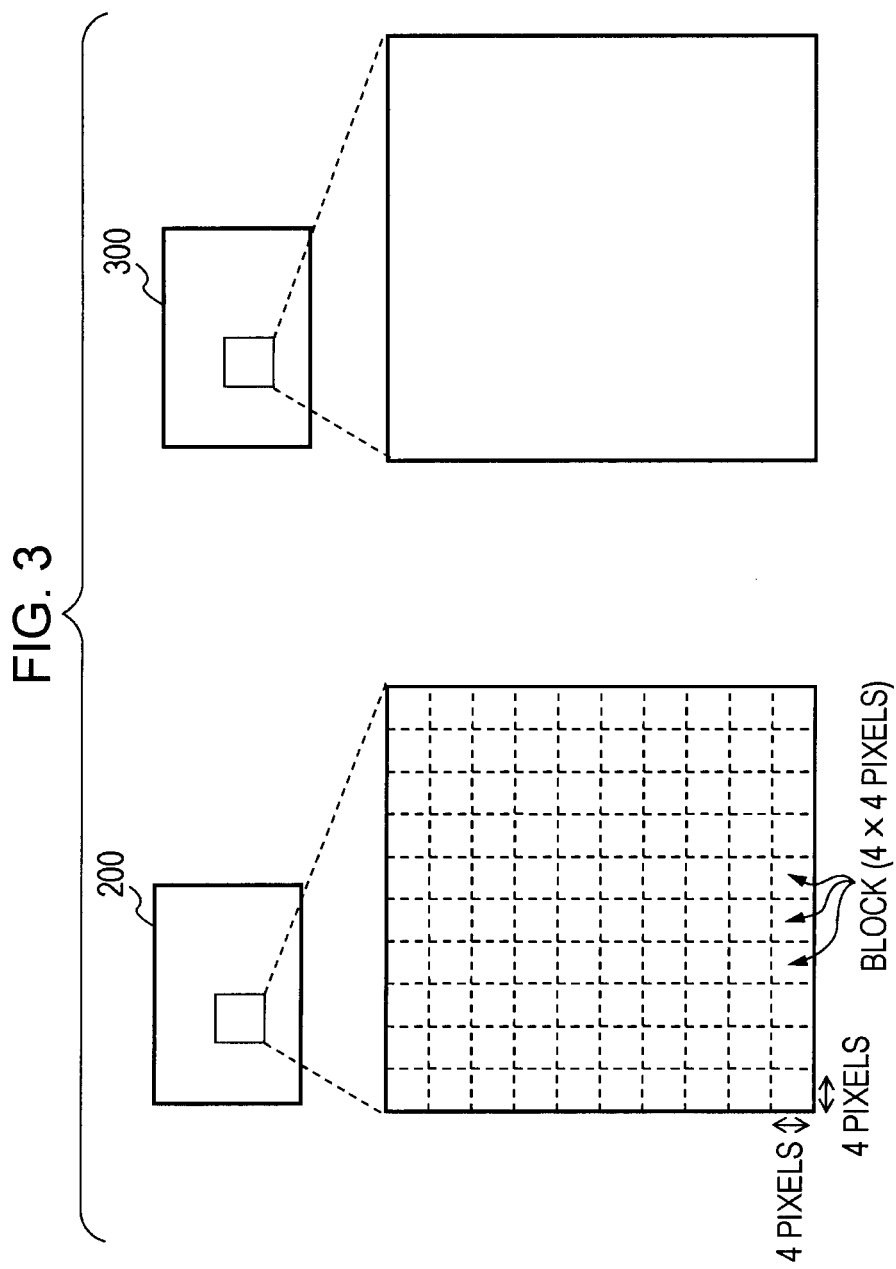
FIG. 3 is a diagram illustrating an example of the block division process executed by an image processing apparatus according to an exemplary embodiment of the present invention.

FIG. 3 is a diagram illustrating an example process for dividing the L image 200 into blocks of 4×4 pixels. In FIG. 3, a portion of the L image 200 is enlarged, and 100 blocks of 4×4 pixels with 10 blocks in the vertical direction and 10 blocks in the horizontal direction are illustrated. An enlarged portion of the R image 300, which is located at the same position as that in the L image 200, is also illustrated.

The similarity calculation unit 102 individually calculates similarities between each block in the L image 200, which is defined by the block division unit 101, and all candidate corresponding positions (candidate corresponding blocks) that can be defined in the search range defined in the R image 300.

As described previously, a region (search range) within which a corresponding position in the R image 300 that corresponds to one block in the L image 200 is searched for may be an entire range of the R image 300, or a limited region may be defined in advance. Defining a search range allows the search process time to be reduced. The similarity calculation unit 102 and the likelihood calculation unit 103 execute the processes within the search range. A specific example of determining a search range will now be described.

For example, a search range can be determined in accordance with an estimated distance of an object. When the object is located at a position a distance D from two cameras with which the L image 200 and the R image 300 are photographed, the amount of deviation d between corresponding positions of the object in images obtained from the respective cameras is given by the following equation $$d=(f \times B)/(D \times p),$$

where
  f denotes the focal length of the two cameras,
  B denotes the distance between the two cameras, and
  p denotes the pixel pitch of solid-state imaging elements such as complementary metal-oxide semiconductor (CMOS) sensors mounted in the cameras.

It is assumed that f=10 mm, B=100 mm, and p=0.01 mm, and it is also assumed that the distance of an object from an assumed camera ranges from 1 m to infinity. When the distance of the object is 1 m, the amount of deviation between corresponding positions in the L image 200 and the R image 300 is 10 mm from the above equation. When the distance is infinity (D=∞), likewise, the amount of deviation is 0 from the above equation. Thus, the amount of deviation d between the corresponding positions can be estimated to be 0 to 10 mm. Consequently, the search range in the R image 300 with respect to one block defined in the L image 200 can be the range of a region that is shifted by, for example, 0 to 10 mm from a block position in the R image 300 corresponding to the position of the block in the L image 200.

An image may include objects located various distances from the cameras. The search range is determined by taking into account the distances, an error included in photographed images, and the like. For example, when the amount of deviation d calculated under the conditions described above is 0 to 10 mm, corresponding points of all the objects located within the distance ranging from 1 m to infinity can be searched if a search range that is slightly larger than 10 mm is defined. In this manner, it is possible to define a search range on the basis of photographic conditions. It is to be understood that an entire image range of the R image 300 instead of a specific portion of the R image 300 may be defined as a search range for one block in the L image 200.

Figure 4:
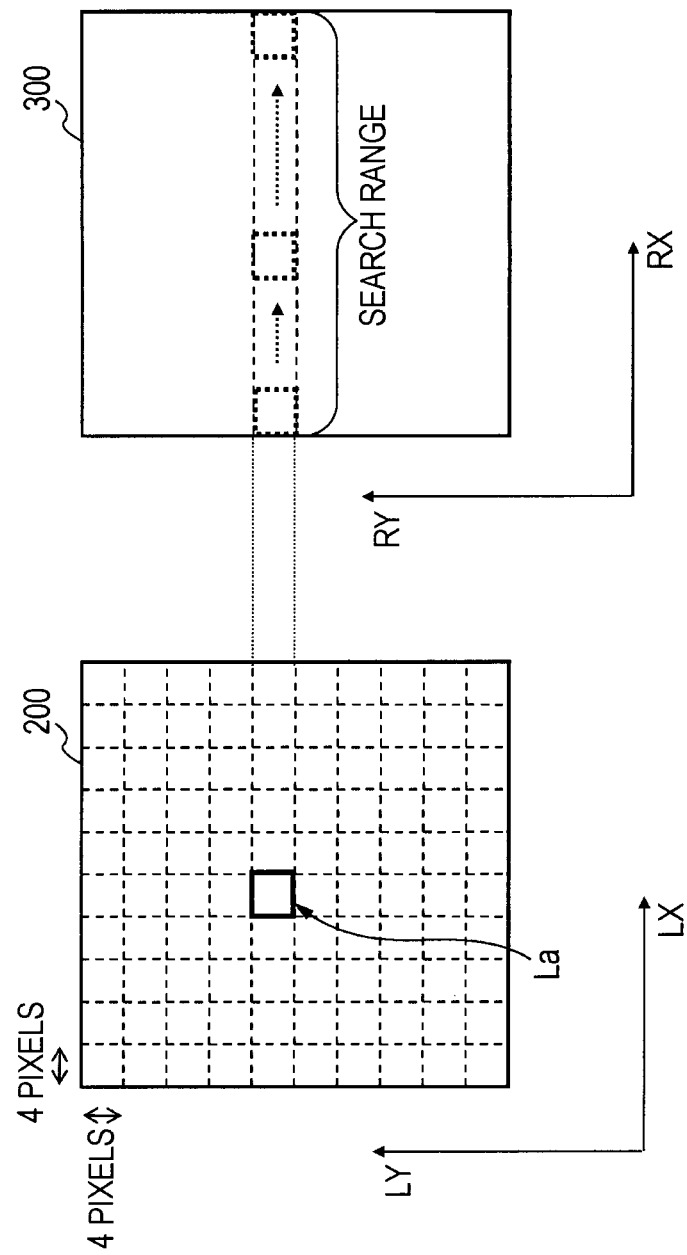
FIG. 4 is a diagram illustrating an example of a search range defined in a corresponding point search process executed by an image processing apparatus according to an exemplary embodiment of the present invention.

As described previously, when the two cameras are placed completely in parallel, corresponding positions of a certain block in the vertical direction are generally the same in the two images. Thus, the search range of the corresponding position in the R image 300 may be defined only in the horizontal direction. That is, as illustrated in FIG. 4, the search range of a corresponding position in the R image 300 that corresponds to the position of a block La in the L image 200 may be defined as a search range that is shifted by the maximum amount of deviation d determined in the process described above in the horizontal direction at the same height (LY=RY) in the R image 300. In the following description of exemplary embodiments, by way of example, the search range illustrated in FIG. 4 is defined and the process is performed.

The similarity calculation unit 102 individually calculates similarities between each block in the L image 200, which is defined by the block division unit 101, and all candidate corresponding positions (candidate corresponding blocks) that can be defined in the search range defined in the R image 300.

A similarity may be represented using a sum of differential absolute values between pixels, a sum of squares of differences between pixels, or any other suitable expression. For example, when a similarity is represented using a sum of differential absolute values between pixels, the similarity calculation unit 102 calculates a similarity F given by Equation (1) as follows:

$$F(i, d) = \sum_{p \in B_i} |I(p) - J(p + d)| \quad (1)$$

In Equation (1),

F(i, d) denotes the similarity between the i-th block among the blocks that form the L image 200 and a position defined by a vector d (see FIG. 5) in the R image 300, $B_i$ denotes the set of coordinates of pixels that form the i-th block, I(p) denotes the pixel value at coordinates p in the L image 200, and J(p+d) denotes the pixel value at coordinates (p+d) in the R image 300.

The similarity F given in Equation (1) has a small value when the similarity between a block in the L image 200 and the corresponding block in the R image 300 is high, and has a large value when the similarity is low. The minimum value of the similarity F given in Equation (1) is 0, and the similarity F is 0 when a block in the L image 200 and the corresponding block in the R image 300 match.

A specific example of the similarity calculation process executed in the similarity calculation unit 102 will be described with reference to FIG. 5.

Figure 5:
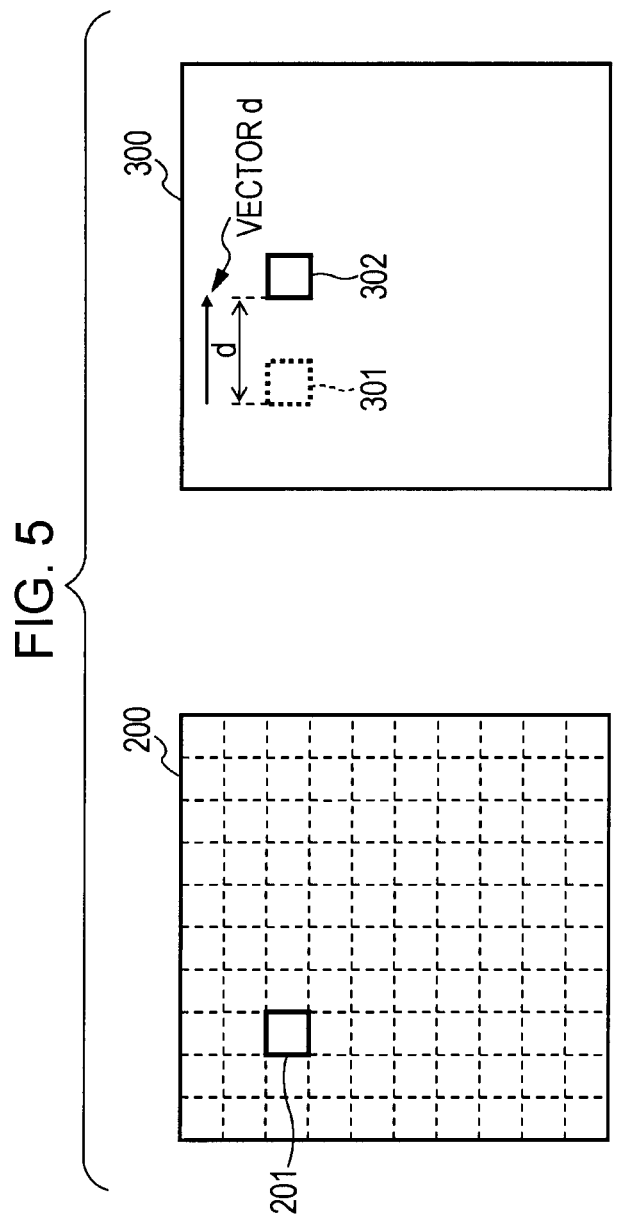
FIG. 5 is a diagram illustrating a specific example of a similarity calculation process executed in a similarity calculation unit.

In FIG. 5, when a block 201 included in the L image 200 is the i-th block, then $B_i$ is the set of pixels included in the block 201 and I(p) is the pixel value of each pixel included in the block 201. Further, if a block region 301 in the R image 300 illustrated in FIG. 5, which is indicated by a dotted line, is located at the same image position as that of the block 201 in the L image 200, a pixel value within a block region 302 that is shifted by the distance d from the image position is represented by J(p+d). The similarity calculation unit 102 calculates a sum of differential absolute values between the pixels, and determines the sum as the similarity between the i-th block and the region in the R image 300 defined by the distance d (the block region 302).

When corresponding positions in the R image 300 that correspond to two blocks adjacent in the horizontal direction in the L image 200 are assigned, the likelihood calculation unit 103 calculates the likelihood of the corresponding positions.

Specifically, a process based on the assumption that corresponding positions to adjacent blocks do not greatly vary is performed.

When corresponding positions in the R image 300 that correspond to adjacent blocks in the L image 200 differ greatly, a low likelihood is defined. In this case, for example, the corresponding positions in the R image 300 that correspond to the adjacent blocks in the L image 200 may not be adjacent but may be spaced apart or may overlap. In such a case, a low likelihood is defined.

When corresponding positions in the R image 300 that correspond to adjacent blocks in the L image 200 are close to each other, a high likelihood is defined. In this case, for example, the corresponding positions in the R image 300 that correspond to the adjacent blocks in the L image 200 may be adjacent. In such a case, a high likelihood is defined.

A specific example of the likelihood calculation process of the likelihood calculation unit 103 will be described with reference to FIG. 6.

Figure 6:
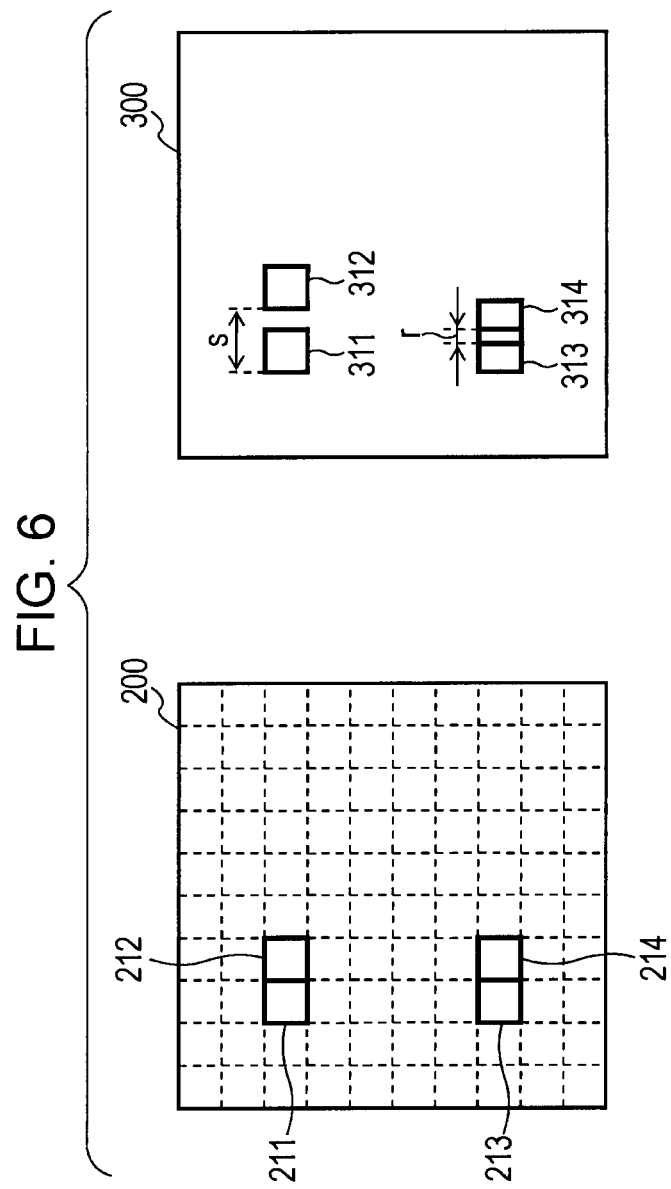
FIG. 6 is a diagram illustrating a specific example of a likelihood calculation process executed by a likelihood calculation unit.

For example, as illustrated in FIG. 6, it is assumed that corresponding regions in the R image 300 that correspond to two adjacent blocks 211 and 212 in the L image 200 are blocks 311 and 312, respectively. As illustrated in FIG. 6, there is a space between the blocks 311 and 312. In this case, the block pitch is represented by "s".

In FIG. 6, it is also assumed that corresponding regions in the R image 300 that correspond to other two adjacent blocks 213 and 214 in the L image 200 are blocks 313 and 314, respectively. As illustrated in FIG. 6, the corresponding regions, that is, the blocks 313 and 314, partially overlap. In this case, the overlap between the corresponding regions is represented by "r". The likelihood calculation unit 103 calculates a likelihood H(s, r) of the above corresponding regions using r and s in accordance with the following equations:

$$G_{space}(s) = C|s| \quad (2)$$

$$G_{overlap}(r) = Dr \quad (3)$$

$$H(s, r) = G_{space}(s) + G_{overlap}(r) \quad (4)$$

In Equation (2), $G_{space}(s)$ denotes the likelihood based on the space s between the corresponding regions.

In Equation (3), $G_{overlap}(r)$ denotes the likelihood based on the overlap r between the corresponding regions.

The finally obtained likelihood of the corresponding regions is given by H(s, r) in Equation (4).

In Equation (2), C is a parameter for controlling changes of the likelihood based on the space s, and is set to a desired value in advance. While the calculation of $G_{space}(s)$ is based on the absolute values, $G_{space}(s)$ may be any function that increases as the absolute value of the space s between the corresponding regions increases. For example, the square of s may also be used.

In Equation (3), D is a parameter for controlling changes of the likelihood based on the overlap r between the corresponding regions, and is set to a desired value in advance. Further, $G_{overlap}(r)$ may also be a function having a value that increases as the overlap r between the corresponding positions increases. Note that the smaller the value of the likelihood H is, the higher the likelihood is.

The corresponding position determination unit 104 calculates evaluation values on the basis of the similarities obtained from the similarity calculation unit 102 and the likelihoods obtained from the likelihood calculation unit 103, and assigns a corresponding position having an optimum evaluation value to each block included in the L image 200.

When an amount of deviation between a block in the L image 200 and the corresponding block in the R image 300 is represented by "d" (see FIG. 5), an evaluation value X(d) between blocks having the above amount of deviation (d) is determined in accordance with, for example, Equation (5) as follows:

$$X(d) = \sum_{i \in I} \{F(i, d_i) + \lambda H(s_i, r_i)\} \quad (5)$$

where I denotes the set of indices of blocks on which optimization is to be performed.

For example, when optimization is performed on all the blocks that form an image, I is the set of indices of all the blocks that form the image.

A coefficient X is used to adjust the effect of similarity and likelihood on an evaluation value.

In Equation (5), F denotes the similarity between, when the corresponding position to the i-th block given in Equation (1) is represented by $d_i$, the i-th block and the corresponding position $d_i$ in the R image 300; and H denotes the likelihood given in Equation (4) which is calculated on the basis of the space $s_i$ between the corresponding position to the i-th block and the corresponding position to the adjacent (i−1)-th block and the overlap $r_i$ between the corresponding position to the i-th block and the corresponding position to the (i−1)-th block.

The space $s_i$ and the overlap $r_i$ are calculated using the equations below when the corresponding positions to the i-th block and the (i−1)-th block are represented by $d_i$ and $d_{i-1}$, respectively:

$$s_i = d_i - d_{i-1} \qquad (6)$$

$$r_i = \begin{cases} d_{i-1} - d_i & 0 < d_{i-1} - d_i \leq N \text{ and } i > 0 \\ 0 & \text{else} \end{cases} \qquad (7)$$

In Equation (7), N denotes the block size. In Equation (5), d is a vector defined by a corresponding position $d_i$ to each block. The corresponding position determination unit 104 determines a combination d of each block and a corresponding position for which the evaluation value X is minimum, and determines the resulting corresponding position as a position in the R image 300 corresponding to the block.

The evaluation value X(d) between blocks having the amount of deviation (d) is calculated using the similarity F and the likelihood H, as given in Equation (5) above.

As described previously with reference to Equation (1), the larger the similarity between corresponding blocks in the L image 200 and the R image 300 is, the smaller the value of the similarity F becomes (approaches 0). Also, the higher the likelihood between corresponding blocks in the L image 200 and the R image 300 is, the smaller the value of the likelihood H becomes.

Therefore, the evaluation value X(d) given in Equation (5) above has a small value when the similarity between corresponding blocks in the L image 200 and the R image 300 and the likelihood are high.

That is, the corresponding position determination unit 104 calculates the evaluation value X(d) on the basis of the similarity F obtained from the similarity calculation unit 102 and the likelihood H obtained from the likelihood calculation unit 103, and assigns a corresponding position for which the evaluation value X(d) is minimum to each block included in the L image 200.

Optimization that is performed on blocks arranged in a horizontal line in an image will be described with reference to FIG. 7. Specifically, it is determined which position in a search range 321 within which a corresponding region is searched for in the R image 300, each block in a block sequence 221 located in a horizontal line of the L image 200 illustrated in FIG. 7 corresponds to.

In the determination process, the corresponding position determination unit 104 determines, as a corresponding position, a position for which the evaluation value X(d) given in Equation (5) is minimum. This process is performed sequentially on all the block sequences included in the L image 200.

That is, the positions of optimum corresponding regions (corresponding blocks) in the R image 300 that correspond to all the block sequences included in the L image 200 are determined. The corresponding position determination process for each block is performed so that the evaluation value X(d) described above can become smaller. This process is referred to as an "optimization process".

Optimization that is performed on the block sequence 221 located in a horizontal line of the L image 200 illustrated in FIG. 7 will be described. When an index i of each block included in the block sequence 221 is set to i=0, . . . , 9.

Hence, I given in Equation (5) above, that is, the set I of indices of blocks on which optimization is to be performed, is expressed as

I={0, 1, . . . , 9}.

Figure 7:
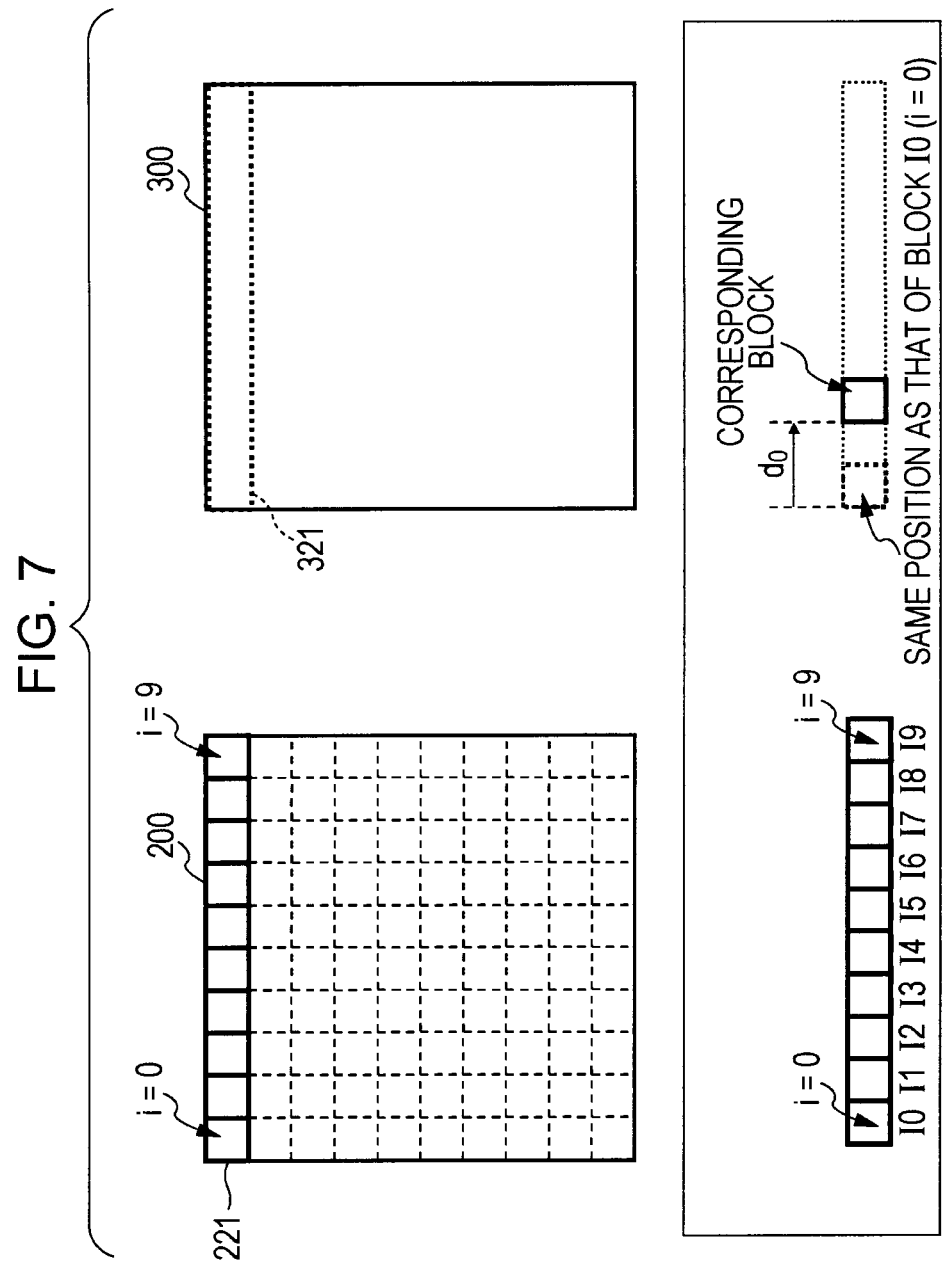
FIG. 7 is a diagram illustrating optimization that is performed on blocks arranged in a horizontal line in an image.

As indicated in an example of the vector $d_i$ representing a corresponding block in the search range in the lower part of FIG. 7, the position of a block in the R image 300 corresponding to a block i in the L image 200 is represented by vector $d_i$. The vector $d_i$ is a vector that starts from the same position in the R image 300 as that of a block Ii in the L image 200 and that ends at the position of a corresponding block.

The similarity $F(i, d_i)$ given in Equation (1) above is the similarity between, when a corresponding position in the R image 300 that corresponds to the i-th block Ii in the L image 200 is defined by the vector $d_i$, the block Ii in the L image 200 and the corresponding region (corresponding block) in the R image 300.

Further, the likelihood $H(s_i, r_i)$ between corresponding blocks in the R image 300 that correspond to a set of adjacent blocks in the L image 200 is obtained using Equations (4), (6), and (7) on the basis of the vector $d_i$.

A combination of vectors $d_o$ to $d_9$ representing the corresponding positions in the R image 300 that correspond to blocks I0 to I9 arranged in a horizontal line in the L image 200 illustrated in FIG. 7, respectively, is given by Equation (8) as follows:

$$d=[d_0, d_1, d_2, d_3, d_4, d_5, d_6, d_7, d_8, d_9] \qquad (8)$$

The evaluation value X(d) can be calculated using the vectors $d_0$ to $d_9$ corresponding to the blocks I0 to I9, respectively, in accordance with Equation (5) above.

The corresponding position determination unit 104 determines a combination of corresponding positions for which the determined evaluation value X(d) is minimum, d=[$d_0$ to $d_9$], and defines the obtained vectors $d_0$ to $d_9$ as distance information indicating the corresponding positions in the R image 300 that correspond to the zeroth to ninth blocks.

That is:

The corresponding position in the R image 300 to the block I0 in the L image 200 is located at a position that is shifted by $d_o$ from a block-I0 position in the R image 300 (which is the same position as that of the block I0 in the L image 200).

The corresponding position in the R image 300 to the block I1 in the L image 200 is located at a position that is shifted by $d_1$ from a block-I1 position in the R image 300 (which is the same position as that of the block I1 in the L image 200).

In this manner, the corresponding positions in the R image 300 to the blocks I0 to I9 in the L image 200 are located at positions that are shifted by $d_0$ to $d_9$ from the block-I0 to block-I9 positions in the R image 300 (which are the same positions as those of the blocks I0 to I9 in the L image 200, respectively).

The corresponding position determination unit 104 performs a corresponding position determination process for each block so that, for example, the evaluation value X(d)

given in Equation (5) above can become smaller for the vectors $d_0$ to $d_9$ representing the corresponding positions in the R image 300 that correspond to the blocks I0 to I9 arranged in a horizontal line in the L image 200 illustrated in FIG. 7, respectively. This process is called an "optimization process".

The process described with reference to FIG. 7 may be an example process for determining the vectors $d_0$ to $d_9$ representing the corresponding positions in the R image 300 that correspond to the ten blocks I0 to I9 in the L image 200, respectively. As described previously, when optimization is performed on all the blocks included in an image, I is the set of indices of all the blocks included in the image.

The process performed on a large number of blocks involves a large amount of calculation. Thus, preferably, the process of defining a search range in advance, as described above, calculating evaluation values within the search range, comparing the evaluation values, and selecting a minimum value is performed.

For example, candidate vectors $d_i$ representing corresponding positions to a block Ii may be defined in advance so as to range from −5 to 0. The range of −5 to 0 means that the range from a position that is shifted to the left by five pixels to a position having an amount of deviation of 0 is defined as the search range.

In this way, an amount of deviation is defined for each of the ten blocks I0 to I9 in the L image 200 illustrated in FIG. 7. The combinations of all the candidate corresponding positions are assigned to the vectors $d_0$ to $d_9$, and an evaluation value is calculated based on each combination of corresponding positions. Therefore, a combination of corresponding positions having a minimum evaluation value can be obtained.

In the example illustrated in FIG. 7, six candidate block positions with a block deviation position $d_i=-5$ to 0 are provided for each of ten blocks I0 to I9, and $6^{10}$ combinations of corresponding positions exist.

Evaluation values X(d) for all the combinations are calculated in accordance with Equation (5) above.

The results are compared, and a combination of $d_o$ to $d_9$ for which the evaluation value X(d) is minimum, that is, $$d=[d_0, d_1, d_2, d_3, d_4, d_5, d_6, d_7, d_8, d_9],$$

is determined as the vectors $d_o$ to $d_9$ representing the corresponding positions in the R image 300 that correspond to the blocks I0 to I9 in the L image 200.

However, even when the range of $d_i$ is defined by limiting a search range in this manner, for example, in FIG. 7, six candidate block positions with a block deviation position $d_i=-5$ to 0 are provided for each of ten blocks I0 to I9, and $6^{10}$ combinations of corresponding positions exist.

If the calculation is performed on all the blocks included in the L image 200, the amount of calculation is large.

In order to further reduce the amount of calculation, an existing optimization technique may be applied. For example, as illustrated in FIG. 7, when optimization is performed on the sequence of blocks I0 to I9 arranged in a horizontal line, dynamic programming may be applied. In this case, a reduction in the amount of calculation as well as acquisition of an optimum combination of corresponding positions (having a minimum evaluation value), as in the sequential calculations of evaluation values, can be achieved.

An example of the stereo matching process using dynamic programming will be described with reference to FIG. 8 and the subsequent figures.

Dynamic programming is a technique for efficiently solving a problem by breaking the problem down into sub-problems and using solutions to the sub-problems recursively.

An example of determining a combination of corresponding positions that exhibits an optimum evaluation value using dynamic programming will be described using FIGS. 8 to 16.

Figure 8:
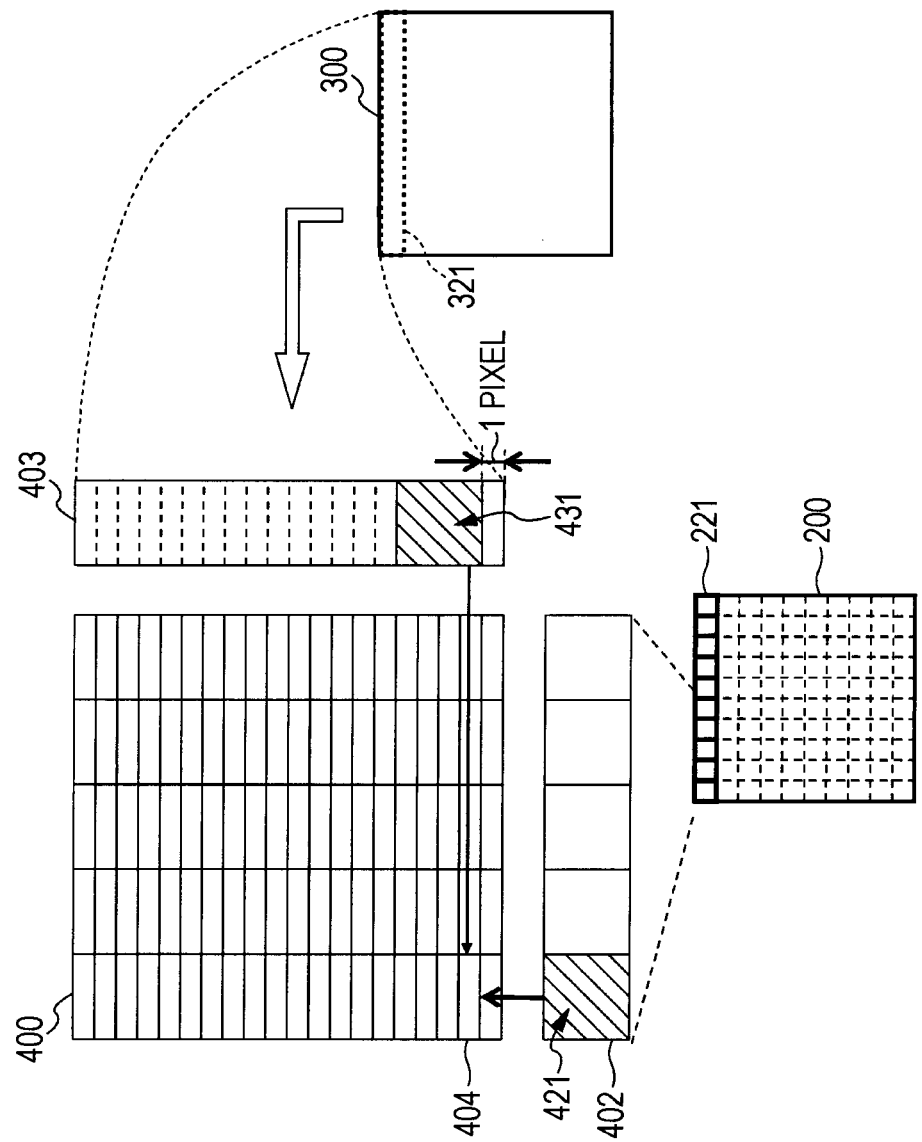
FIG. 8 is a diagram illustrating an example process of stereo matching using dynamic programming.

FIG. 8 illustrates a matrix called a cost matrix which is used to apply dynamic programming. Each element of a cost matrix 400 illustrated in FIG. 8 stores a similarity between each block in an L image and the corresponding portion of an R image. That is, each element of the cost matrix 400 represents a similarity.

A similarity storage process that is performed for one similarity storage region 404 illustrated in FIG. 8 will be described. An L image block sequence 402 corresponds to, for example, the block sequence 221 in the L image 200 illustrated in FIG. 7. In this example, the size of each block is 4×4 pixels.

An R image band region 403 illustrated in FIG. 8 corresponds to the search range 321 in the R image 300 illustrated in FIG. 7. The illustration in FIG. 8 is rotated 90 degrees. Each column of the cost matrix 400 stores similarities between blocks in the L image and a specific region in the R image.

For example, the similarity storage region 404 illustrated in FIG. 8 stores the similarity between a block 421 in the L image 200 and a pixel region 431 at a specific position in the R image band region 403 that is a search range in the R image 300. The pixel region 431 may be a block region located at a position that is shifted by one pixel from the corresponding position in the R image 300 to the position of the block 421 in the L image 200. In the R image band region 403, the width of one pixel is defined by a dash line.

Figure 9:
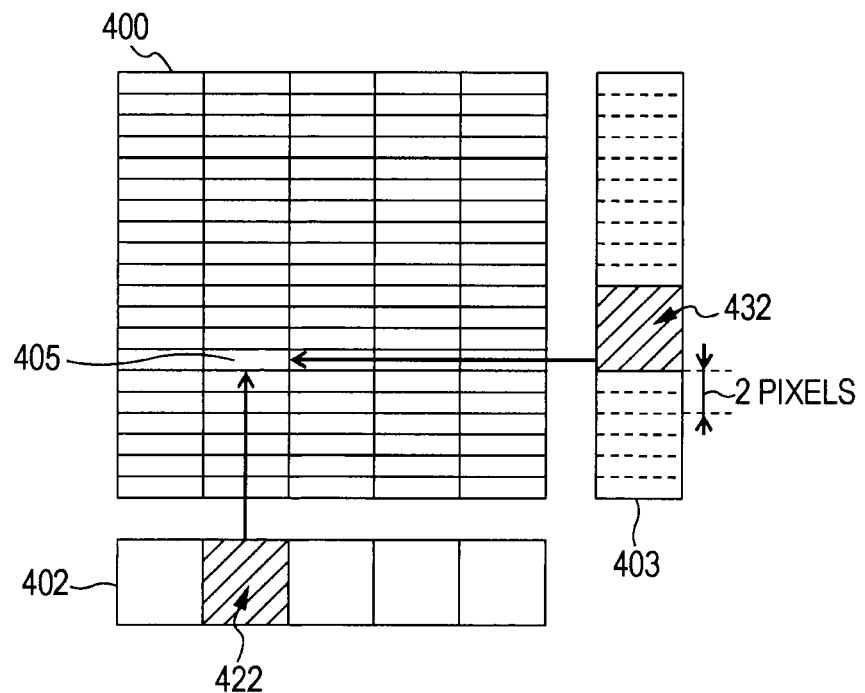
FIG. 9 is a diagram illustrating an example process of stereo matching using dynamic programming.

Referring to FIG. 9, a similarity storage region 405 in the cost matrix 400 stores the similarity between a block 422 in the L image 200 and a pixel region 432 at a specific position in the R image band region 403 that is a search range in the R image 300. The pixel region 432 may be a block region located at a position that is shifted by two pixels from the corresponding position in the R image 300 to the position of the block 422 in the L image 200.

A similarity that is set in each element of the cost matrix 400 may be implemented using, for example, a sum of differential absolute values between pixels in blocks to be compared in the L image 200 and the R image 300, or any other suitable expression. In this case, it may be assumed that the smaller the value stored in the cost matrix 400 is, the higher the similarity is.

Each element of the cost matrix 400 stores a similarity that is calculated in turn in advance or as necessary. However, calculation may not necessarily be performed on all the elements. For example, as described above, the amount of deviation of a block with respect to the corresponding position can be limited to within a predetermined search range. That is, only amounts of deviation d within a search range may be taken into account.

Figure 10:
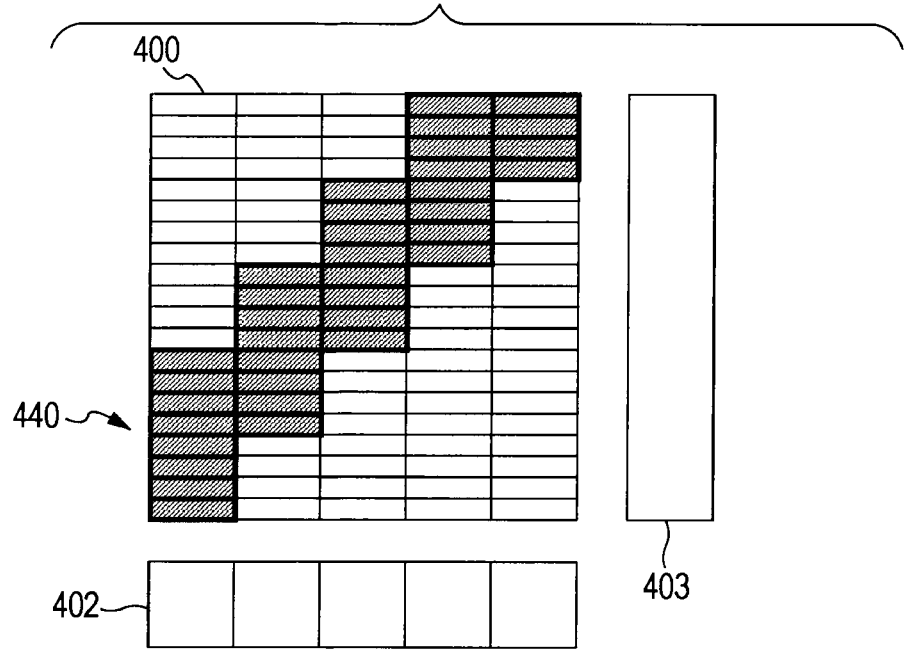
FIG. 10 is a diagram illustrating an example process of stereo matching using dynamic programming.

When the amounts of deviation d corresponding to a search range ranges from 0 to 9 pixels, calculation may be performed on only the elements of similarity storage regions 440 which are indicated by solid lines in FIG. 10. In other words, it may be unnecessary to determine similarities of regions in which no positional deviation occurs between the L image 200 and the R image 300.

Here, each element in the cost matrix 400 is assumed to be a node. Then, a path starts from an individual node in the leftmost column in the cost matrix 400, passes through the nodes in the respective columns once, and finally reaches one of the nodes in the rightmost column in the cost matrix 400. This path represents amounts of deviation of corresponding positions assigned to the blocks.

Figure 11:
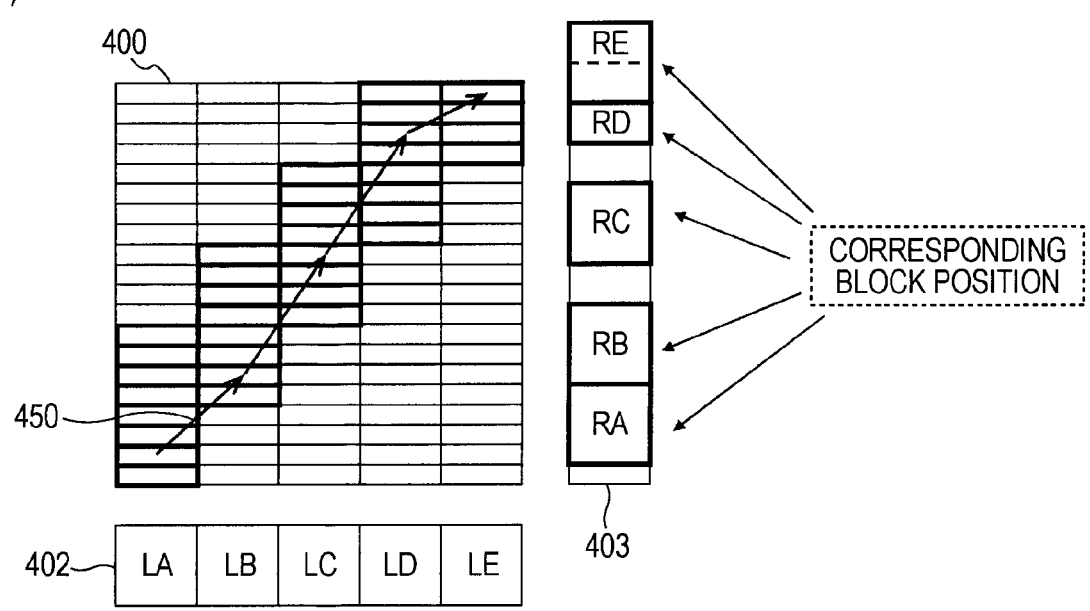
FIG. 11 is a diagram illustrating an example process of stereo matching using dynamic programming.

An example of such a path is, for example, a path 450 indicated by arrows in FIG. 11. The path 450 illustrated in FIG. 11 indicates that blocks LA, LB, LC, LD, and LE in the L image 200 correspond to blocks in the R image 300 at positions that are shifted by 1, 1, 3, 5, and 3 pixels, respectively, in order from the left in the R image 300 (This is not an optimum correspondence but is merely an example of correspondence matching). In FIG. 11, blocks RA to RE are blocks in the R image 300 that are made to correspond to the blocks LA to LE in the L image 200 in accordance with the path 450.

In this case, the total sum of the cost according to the nodes through which the path 450 illustrated in FIG. 11 passes and the cost according to edges connecting nodes is determined to obtain a certain evaluation value for the path 450. If the cost according to the nodes through which the path 450 passes represents similarity and the cost according to edges connecting nodes represents likelihood, the total sum of costs obtained for a certain path (total cost) can be considered to be an evaluation value given by Equation (5), which is obtained for amounts of deviation of corresponding positions with respect to the blocks indicated by the path.

The total cost of the path 450 illustrated in FIG. 11 will be described using FIG. 12. It is assumed that, in the likelihood calculation equations (Equations (2) to (4)) given above, the coefficients C and D are 1.

Then, the amount of deviation of a block A is 1 and the amount of deviation of a block B is 1. Thus, the likelihood corresponding to a path 451 indicated by an arrow (edge) connecting the blocks A and B is 0 based on Equations (2) to (4), (6), and (7).

Likewise, the likelihoods for paths 451 to 454 indicated by arrows connecting blocks are as follows:

The likelihood corresponding to the path 451 indicated by the arrow connecting the blocks A and B is 0.

The likelihood corresponding to the path 452 indicated by the arrow connecting the blocks B and C is 2.

The likelihood corresponding to the path 453 indicated by the arrow connecting the blocks C and D is 2.

The likelihood corresponding to the path 454 indicated by the arrow connecting the blocks D and E is 2.

Figure 12:
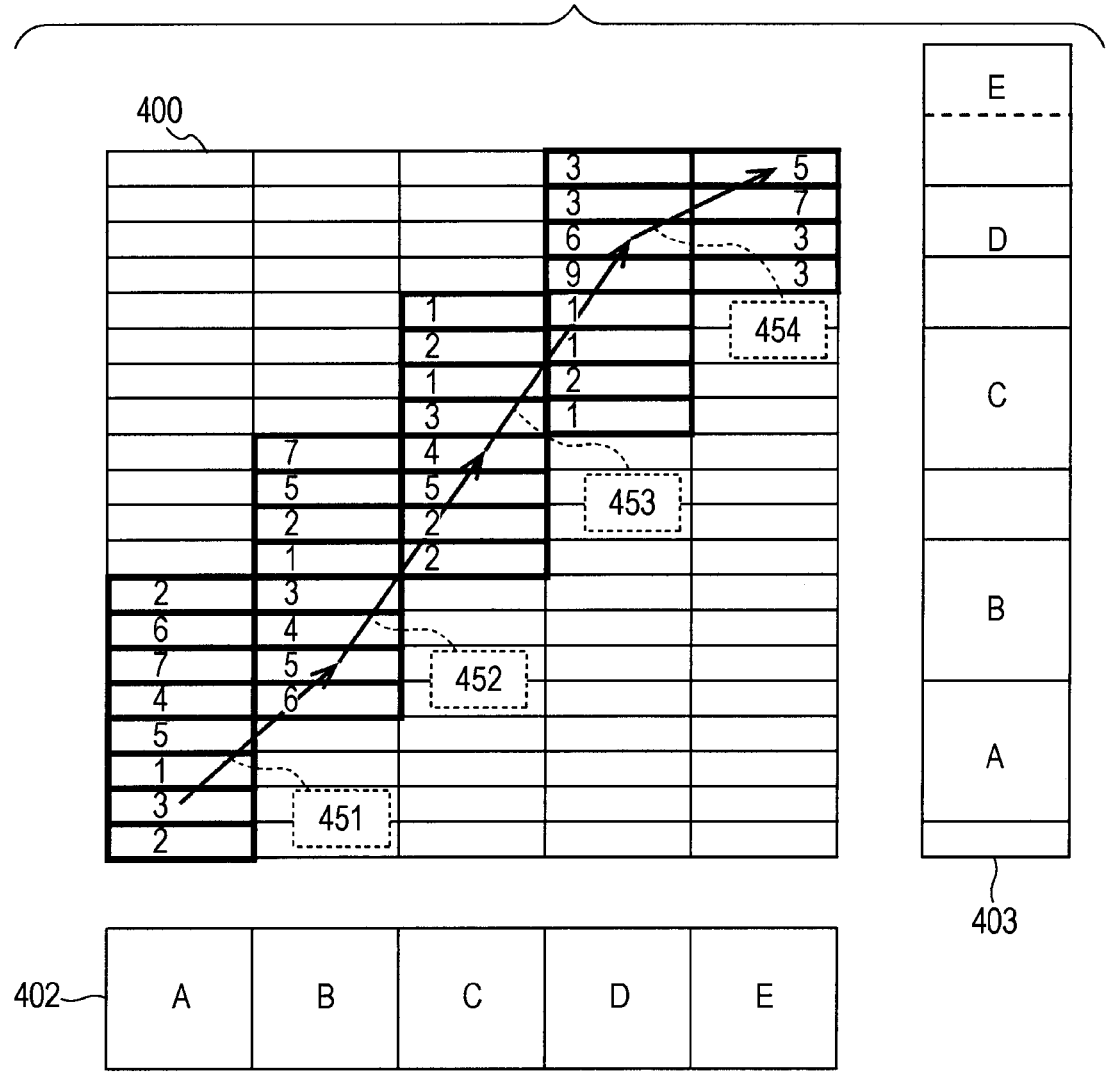
FIG. 12 is a diagram illustrating an example process of stereo matching using dynamic programming.

The numerical values in the cost matrix 400 illustrated in FIG. 12 represent similarities between the blocks in the L image 200 and the corresponding portions of the R image 300 in accordance with the amounts of deviation.

The similarity corresponding to the block A is 3.
The similarity corresponding to the block B is 5.
The similarity corresponding to the block C is 4.
The similarity corresponding to the block D is 6.
The similarity corresponding to the block E is 5.

The total cost for the paths 451 to 454 illustrated in FIG. 12 is 29, which is the sum of the likelihoods and the similarities described above. That is, (0+2+2+2)+(3+5+4+6+5)=29.

Therefore, the total cost for the paths 451 to 454 is 29.

A problem of searching for a corresponding position that is assigned so as to optimize the evaluation value X(d) given by Equation (5) above can be considered to be a problem of searching for a path having a minimum total cost. It is possible to solve the problem by calculating total costs for all possible paths in the manner described above and selecting a path having a minimum total cost. However, this solution may involve an enormous amount of calculation. Dynamic programming facilitates discovery of such a path. A portion of a specific procedure for searching for a path using dynamic programming will now be specifically described.

Figure 13:
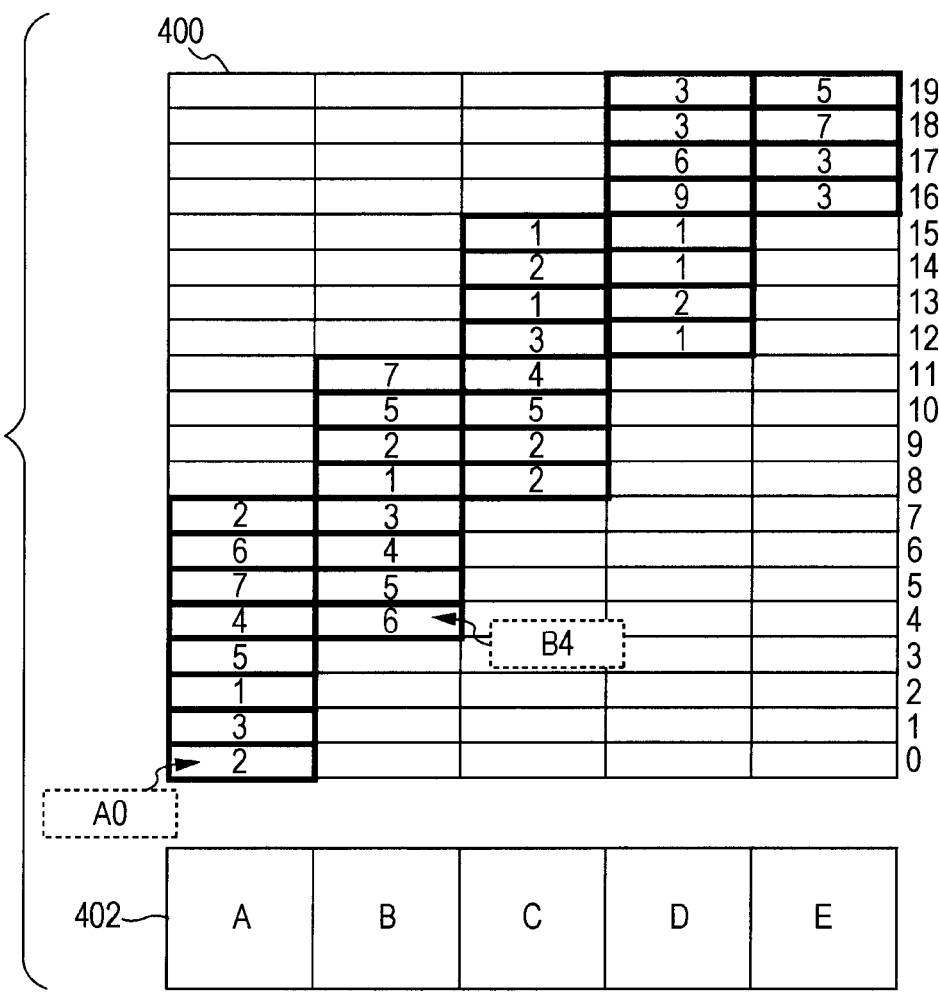
FIG. 13 is a diagram illustrating an example process of stereo matching using dynamic programming.

FIG. 13 illustrates a cost matrix 400 obtained after necessary similarities have been calculated. An optimum path from the column corresponding to the block A to the column corresponding to the block E is searched for using the cost matrix 400. In the following description, the elements in the cost matrix 400 are represented using the characters A to E assigned to the blocks for the column direction, and using indices written on the right side of the cost matrix 400 for the row direction. For example, the bottom leftmost element of the cost matrix 400 is represented by A0 and the top rightmost element is represented by E19.

First, a node in the column A to be connected to each node (node in the column B) corresponding to the column of the block B is searched for. The optimum node to be connected to a node B4 illustrated in FIG. 13 can be found as follows.

First, the connection between the nodes B4 and A0 is considered. In this case, the node A0 has a similarity of 2 and the node B4 has a similarity of 6. The amounts of deviation corresponding to the nodes A0 and B4 are 0. The likelihood is therefore 0.

Consequently, the total cost obtained when the path from the node A0 to the node B4 is selected is given by 2+6+0=8. That is, the total cost is 8.

Similarly, the costs corresponding to the paths from the node A1 to the node B4 and from the node A2 to the node B4 are sequentially calculated. Through the calculation of the costs for the connection between the nodes A0 to A7 and the node B4 in this way, the following results are obtained:

Connection between the nodes A0 and B4: Cost=8
Connection between the nodes A1 and B4: Cost=10
Connection between the nodes A2 and B4: Cost=9
Connection between the nodes A3 and B4: Cost=14
Connection between the nodes A4 and B4: Cost=14
Connection between the nodes A5 and B4: Cost=16
Connection between the nodes A6 and B4: Cost=14
Connection between the nodes A7 and B4: Cost=9

As can be seen from the above results, it is optimum that the node A0 that exhibits a cost of 8 be connected to the node B4. When an optimum partial path is found, the corresponding total cost is overwritten in the cost matrix 400.

Figure 14:
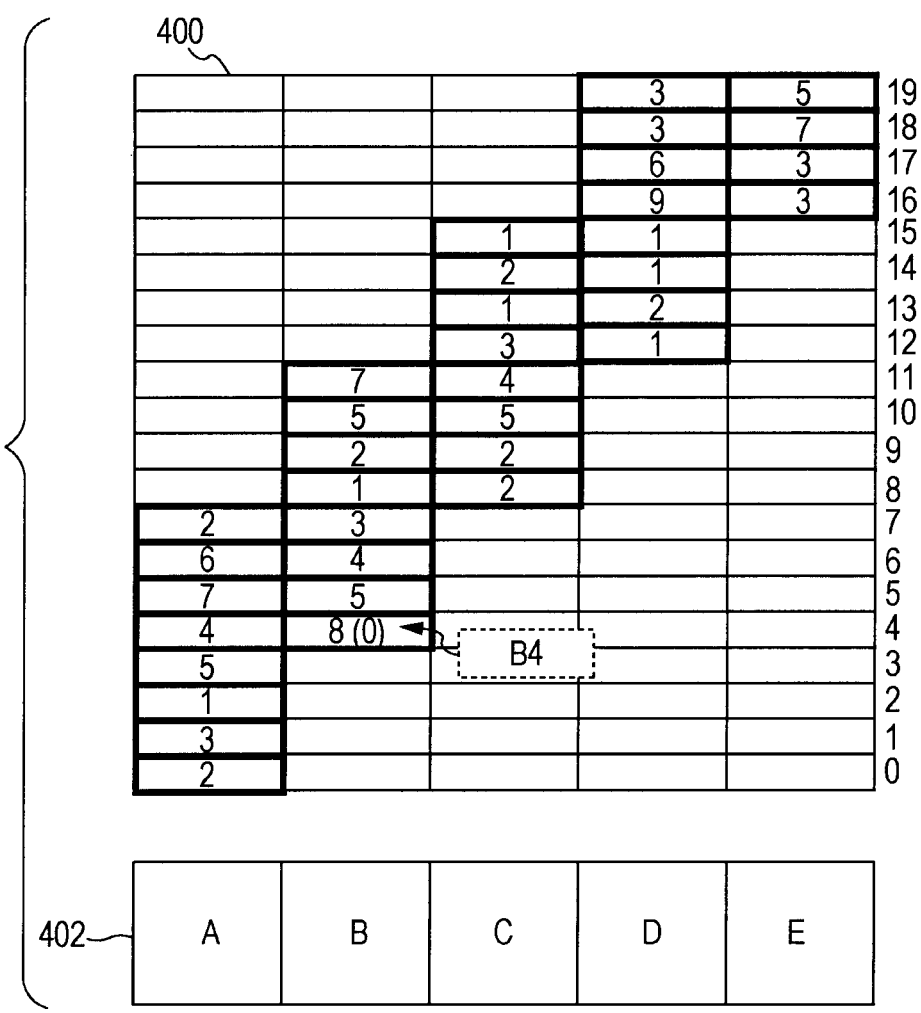
FIG. 14 is a diagram illustrating an example process of stereo matching using dynamic programming.

Specifically, as illustrated in FIG. 14, the value of the node B4 is changed to the value of the total cost determined when the path from the node A0 to the node B4 described above is selected, that is, "8", which is given by

2+6+0=8.

In addition, a numerical value of 0, which indicates an A node that is optimum for reaching the node B4, is also stored. In FIG. 14, this numerical value is in parentheses. In summary, in FIG. 14, the representation "8(0)" for the node B4 indicates that the node that is optimum for reaching the node B4 is the node A0 and that the total cost up to B4 is 8.

Subsequently, the above process is repeatedly performed on the nodes B5 to B11 in sequence. Therefore, the elements of the cost matrix 400 are defined in the manner illustrated in FIG. 15.

Next, the connection between the columns C and B is considered. Since an optimum path among the paths from the nodes in the column A to the nodes in the column B and the total cost therefor are found, a process similar to the process previously performed on each node in the column B is performed on each node in the column C. Thus, an optimum path among the paths from the nodes in the column A to the nodes in the column C is obtained.

Figure 16:
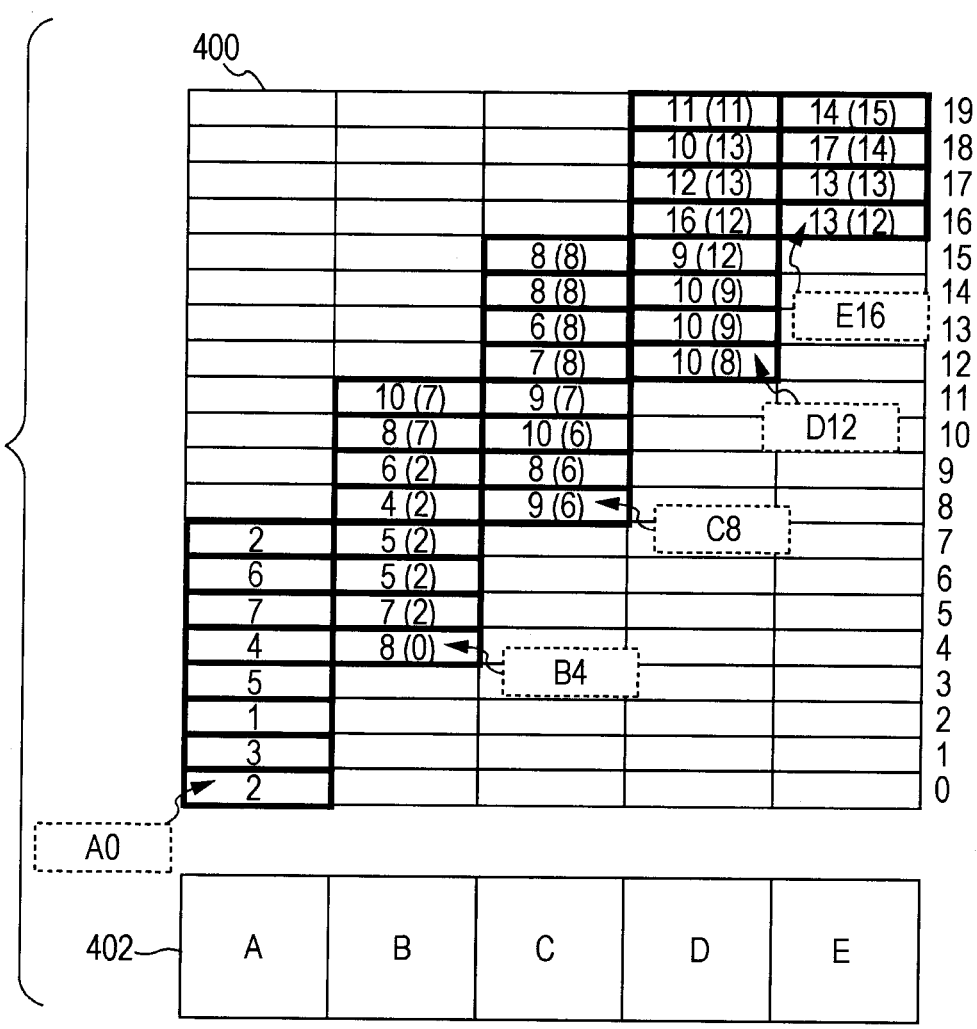
FIG. 16 is a diagram illustrating an example process of stereo matching using dynamic programming.

The process is repeatedly executed on all the columns, and finally a cost matrix 400 as illustrated in FIG. 16 is obtained. The value of each node in the column E represents a total cost of an optimum path among the paths obtained when the optimum path starts from one of the nodes in the column A and reaches the nodes in the column E. Therefore, the node E16 or E17 having a minimum total cost value of 13 may be selected. One of the nodes having the same minimum value may be selected using any method, and here the lowest node, namely, the node E16, may be selected.

As indicated by the value in parentheses of the node E16, the optimum node in the column D to be connected to the node E16 is the node D12. Thus, the node D12 is referred to. As indicated by the value in parentheses of the node D12, the optimum node in the column C to be connected to the node D12 is the node C8. Thus, the node C8 is referred to. As indicated by the value in parentheses of the node C8, the optimum node in the column B to be connected to the node C8 is the node B6. Thus, the node B6 is referred to.

As indicated by the value in parentheses of the node B6, the optimum node in the column A to be connected to the node B6 is the node A2. Finally, it can be determined that the path A2→B6→C8→D12→E16 exhibits a minimum cost. When the amounts of deviation corresponding to the respective nodes are assigned to the blocks, the amounts of deviation represent the correspondences between the blocks in the L image 200 and the corresponding portions of the R image 300 for which the evaluation value is optimized. That is, it is to be understood that when amounts of deviation of 2, 2, 0, 0, and 0 are assigned to the blocks A, B, C, D, and E, respectively, a minimum evaluation value is obtained.

Dynamic programming described with reference to FIGS. 8 to 16 enables efficient determination of a combination of corresponding positions that provide an optimum evaluation value. That is, with the use of dynamic programming, in addition to a reduction in the amount of calculation, acquisition of an optimum combination of corresponding positions (having a minimum evaluation value), as in that when evaluation values are calculated one by one, can be achieved.

2. Example Configuration of Image Processing Apparatus that Implements High-Speed Processing (Second Exemplary Embodiment)

Subsequently, the configuration and process of an image processing apparatus with further increased processing speed according to a second exemplary embodiment of the present invention will be described.

Figure 17:
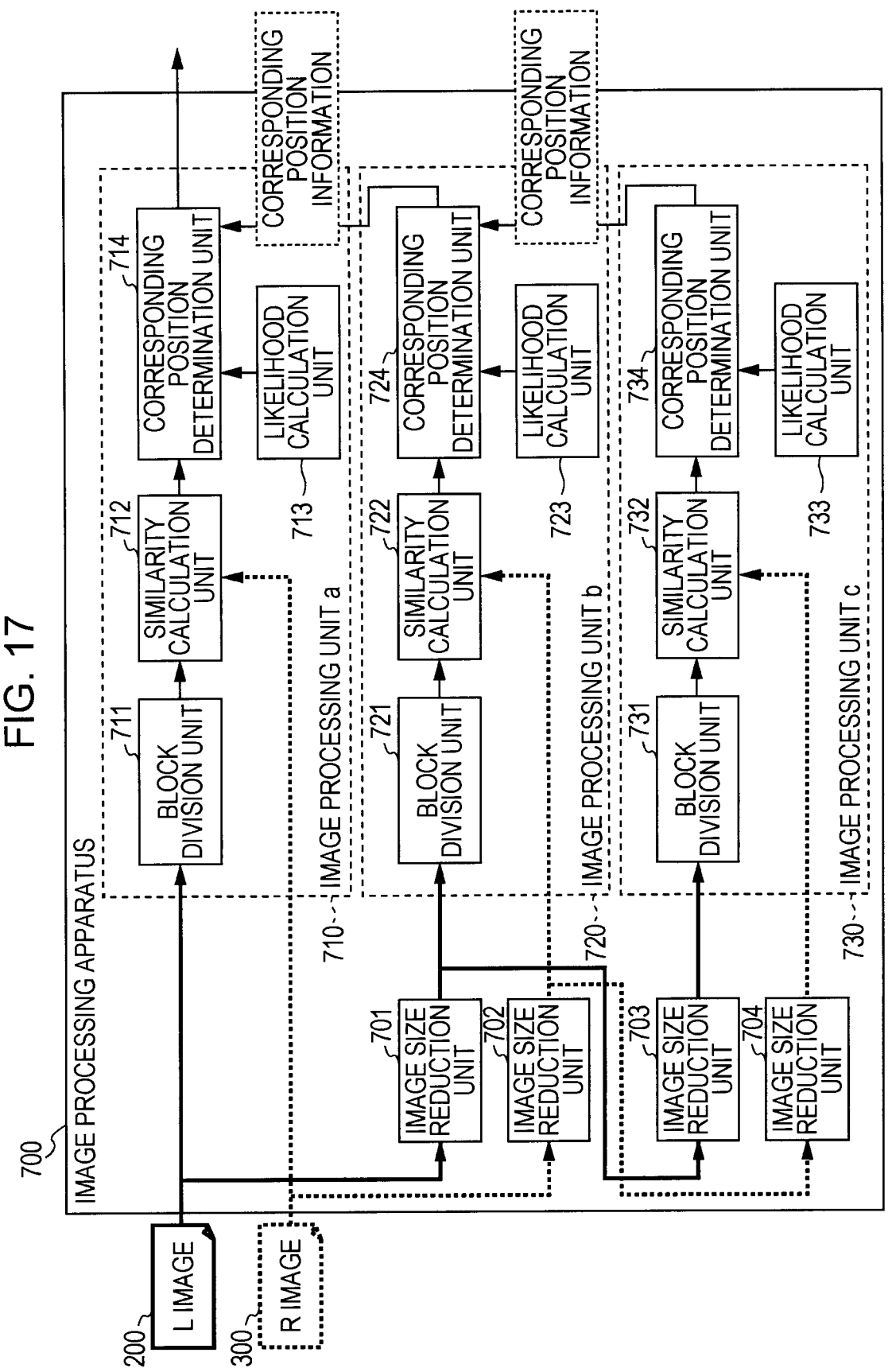
FIG. 17 is a diagram illustrating an example configuration of an image processing apparatus according to an exemplary embodiment of the present invention.

FIG. 17 illustrates an example configuration of an image processing apparatus 700 capable of quickly detecting correspondences between images. The image processing apparatus 700 receives an L image 200 and an R image 300 that are to be subjected to corresponding point detection, and detects corresponding points between the images. This process is similar to that of the image processing apparatus 100 illustrated in FIG. 1 described in the first exemplary embodiment. The image processing apparatus 700 determines which position in the R image 300 each block in the L image 200 corresponds to. That is, the process for determining corresponding points between images is performed.

The image processing apparatus 700 according to the present exemplary embodiment reduces the size of the input images, and performs an correspondence matching process similar that of the image processing apparatus 100 according to the first exemplary embodiment described above on the obtained size-reduced images. Correspondence matching is performed on the images whose size is not reduced on the basis of the obtained results of correspondence matching, resulting in limitation in correspondence matching candidates and reduction in the amount of processing. When the correspondence matching process is performed on the size-reduced images, the block size used for correspondence matching is also reduced in accordance with a reduction ratio similar to the reduction ratio of the image. Therefore, the number of blocks included in the images does not change.

The operation of the image processing apparatus 700 illustrated in FIG. 17 will be described using a specific example process with reference to an example illustrated in FIGS. 18A to 18C.

Figure 18A:
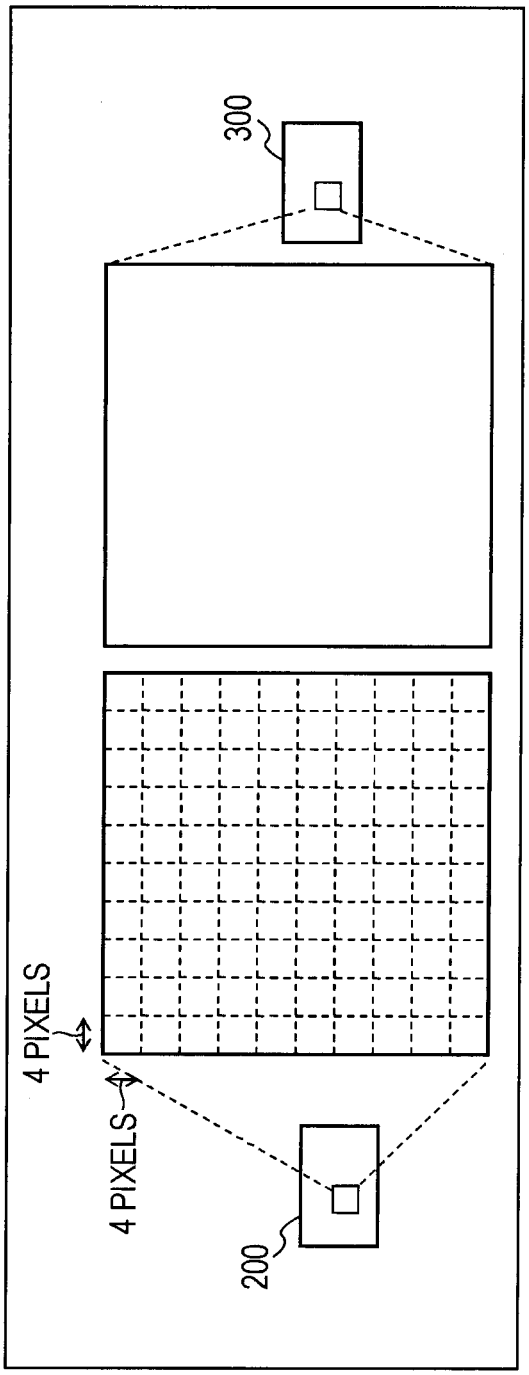
FIGS. 18A to 18C are diagrams illustrating an example of an image size reduction process executed by an image processing apparatus according to an exemplary embodiment of the present invention.

FIG. 18A illustrates image data of input images. FIG. 18B illustrates image data of first size-reduced images. FIG. 18C illustrates image data of second size-reduced images.

The input images illustrated in FIG. 18A are the L image 200 and R image 300 that are input to the image processing apparatus 700 illustrated in FIG. 17. The input images are the L image 200 and the R image 300, which may be similar to those described previously in the first exemplary embodiment with reference to FIG. 1.

The image processing apparatus 700 divides the L image 200 into blocks of 4×4 pixels, and detects correspondences between the L image 200 and the R image 300. First, the L image 200 and the R image 300 input to the image processing apparatus 700 are input to image size reduction units 701 and 702, respectively, and are reduced to one half the original size. Through this size reduction process, first size-reduced image data illustrated in FIG. 18B is generated. That is, a 1/2 reduced L image 821 and a 1/2 reduced R image 822 are obtained.

While a reduction ratio of 1/2 is used here, the reduction ratio may be set to any other value.

The size-reduced L and R images 821 and 822 generated by the image size reduction units 701 and 702 are further reduced to one half the current size by image size reduction units 703 and 704, respectively. Through this size reduction process, second size-reduced image data illustrated in FIG. 18C is generated. That is, a 1/4 reduced L image 851 and a 1/4 reduced R image 852 are obtained.

Figure 18C:
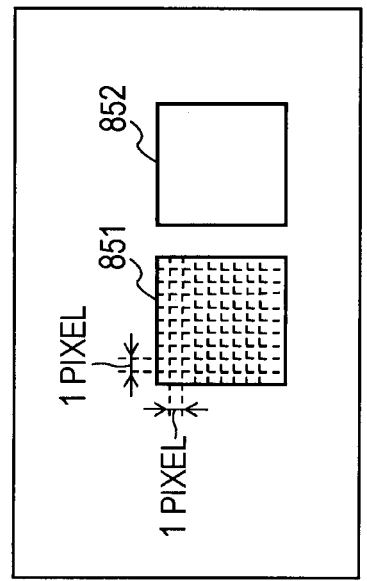

The second size-reduced image data illustrated in FIG. 18C has a size equal to one quarter the size of the input image data illustrated in FIG. 18A.

The 1/4 reduced L image 851 and the 1/4 reduced R image 852 are input to an image processing unit c 730 of the image processing apparatus 700 illustrated in FIG. 17.

The image processing unit c 730 performs a process that is the same as or similar to that of the image processing apparatus 100 described above. Note that the block division unit 731 divides an image into blocks that are reduced in size at the same reduction ratio as that of the image. That is, as illustrated in FIG. 18C, the 1/4 reduced L image 851 is divided into blocks of 1×1 pixel.

A similarity calculation unit 732 individually calculates similarities between each block of 1×1 pixel in the 1/4 reduced L image 851, which is defined by the block division unit 731, and all candidate corresponding positions (candidate corresponding blocks) that can be defined in a search range defined in the 1/4 reduced R image 852.

A likelihood calculation unit 733 defines adjacent block sets each including a plurality of adjacent blocks in the 1/4 reduced L image 851, and determines likelihoods of corresponding block sets defined in the 1/4 reduced R image 852 in units of adjacent block sets defined in the 1/4 reduced L image 851.

A corresponding position determination unit 734 determines a corresponding position having an optimum evaluation value from among the candidate corresponding positions, and assigns the corresponding position to each block. Evaluation values are calculated on the basis of the likelihoods obtained from the likelihood calculation unit 733 and the similarities obtained from the similarity calculation unit 732.

The processes of the similarity calculation unit 732, the likelihood calculation unit 733, and the corresponding position determination unit 734 are similar to the processes of the similarity calculation unit 102, the likelihood calculation unit 103, and the corresponding position determination unit 104 of the image processing apparatus 100 described in the first exemplary embodiment, respectively. The difference is the size of blocks to be processed. The processes are performed on blocks of 1×1 pixel.

Figure 18B:
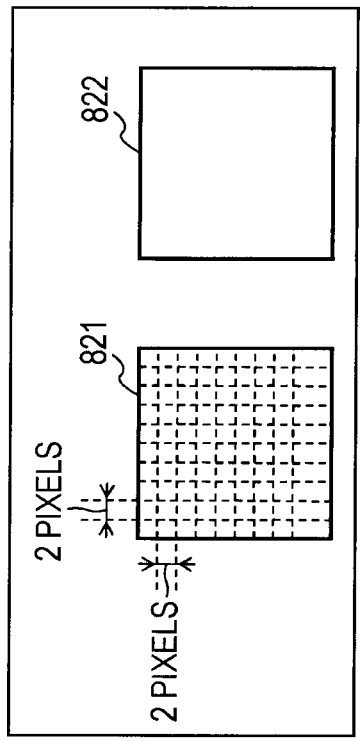

Next, in an image processing unit b 720, a corresponding point search process is performed on the 1/2 reduced L image 821 and the 1/2 reduced R image 822 illustrated in FIG. 18B. A block division unit 721 of the image processing unit b 720 divides an image into blocks using the size of blocks that are reduced in size at the same reduction ratio as that of the image. That is, as illustrated in FIG. 18B, the 1/2 reduced L image 821 is divided into blocks of 2×2 pixels.

All the processes of a similarity calculation unit 722 and a likelihood calculation unit 733 may be similar to the processes of the similarity calculation unit 102 and the likelihood calculation unit 103 of the image processing apparatus 100 described in the first exemplary embodiment, respectively. The difference is the size of blocks to be processed. The processes are performed on blocks of 2×2 pixels.

A corresponding position determination unit 724 receives, from the image processing unit c 730, corresponding position information obtained by executing the corresponding point search process using more reduced images, that is, the 1/4 reduced L image 851 and the 1/4 reduced R image 852 illustrated in FIG. 18C. The corresponding position determination unit 724 determines candidate corresponding positions using the received information, and performs an evaluation value calculation process only on the determined candidate corresponding positions.

The process of the corresponding position determination unit 724 will now be described. The corresponding position determination unit 724 is configured to be capable of receiving corresponding position information in units of blocks of 1×1 pixel of 1/4 reduced images from the corresponding position determination unit 734 of the image processing unit c 730. The corresponding position determination unit 724 determines a candidate corresponding position using Equation (9) as follows:

$$D'_i = \{2d''_i - 1, 2d''_i, 2d''_i + 1\} \quad (9)$$

In Equation (9):

$D'_i$ denotes the set of candidate corresponding positions used when the corresponding position determination unit 724 determines a corresponding position to the i-th block Ii, and $d_i''$ denotes the corresponding position of the i-th block Ii determined by the corresponding position determination unit 734 of the image processing unit c 730.

As may be apparent from Equation (9), the number of candidate corresponding positions determined by the corresponding position determination unit 724 of the image processing unit b 720 is three, which is smaller. That is, candidates of the amount of deviation d of corresponding blocks are three amounts of deviation including $2d_i''$ and values that are shifted to the left and right by one pixel with respect to $2d_i''$, that is, $2d_i''$, $2d_i'' - 1$, and $2d_i'' + 1$.

The amount of deviation d is an amount of deviation in a 1/2 reduced image.

The corresponding position determination unit 724 executes the calculation of the evaluation value X(d), described above, on each block using the above three amounts of deviation d as candidates. Consequently, the amount of calculation is considerably reduced. The candidate corresponding positions may not necessarily be determined using Equation (9), and may be determined based on any result obtained from a further reduced image.

Subsequently, an image processing unit a 710 illustrated in FIG. 17 performs a process. The image processing unit a 710 executes a corresponding point search process on the L image 200 and the R image 300 illustrated in FIG. 18A. A block division unit 711 of the image processing unit a 710 divides the L image 200 into blocks of 4×4 pixels.

All the processes of a similarity calculation unit 712 and a likelihood calculation unit 713 may be similar to the processes of the similarity calculation unit 102 and the likelihood calculation unit 103 of the image processing apparatus 100 described in the first exemplary embodiment, respectively.

A corresponding position determination unit 714 receives, from the image processing unit b 720, corresponding position information obtained by executing a corresponding point search process using size-reduced images. The corresponding position determination unit 714 determines candidate corresponding positions using the received information, and performs an evaluation value calculation process only on the determined candidate corresponding positions.

The process of the corresponding position determination unit 714 will now be described. The corresponding position determination unit 714 is configured to be capable of receiving corresponding position information from the corresponding position determination unit 724 of the image processing unit b 720. The corresponding position determination unit 714 determines a candidate corresponding position using Equation (10) as follows:

$$D_i = \{2d'_i - 1, 2d'_i, 2d'_i + 1\} \quad (10)$$

In Equation (10):

$D_i$ denotes the set of candidate corresponding positions used when the corresponding position determination unit 714 determines a corresponding position to the i-th block, and $d_i'$ denotes the corresponding position of the i-th block determined by the corresponding position determination unit 724 of the image processing unit b 720.

As may be apparent from Equation (10), the number of candidate corresponding positions determined by the corresponding position determination unit 714 of the image processing unit a 710 is three, which is smaller. That is, candidates of the amount of deviation d of corresponding blocks are three amounts of deviation including $2d_i'$ and values that are shifted to the left and right by one pixel with respect to $2d_i'$, that is, $2d_i'$, $2d_i' - 1$, and $2d_i' + 1$.

The amount of deviation d is an amount of deviation in a non-size-reduced image.

The corresponding position determination unit 714 executes the calculation of the evaluation value X(d), described above, on each block using the above three amounts of deviation d as candidates. Consequently, the amount of computation is considerably reduced. The candidate corresponding positions may not necessarily be determined using Equation (10), and may be determined based on any result obtained from a further reduced image.

Accordingly, the image processing apparatus 700 illustrated in FIG. 17 hierarchically generates size-reduced images, and uses corresponding position information obtained for the size-reduced images to determine candidate corresponding positions in larger images. A process is performed only on the determined candidate corresponding positions to calculate evaluation values. Through this process, a corresponding point can be calculated with a considerably reduced amount of calculation, resulting in implementation of high-speed corresponding point search.

3. Image Capture Apparatus according to Exemplary Embodiment

Figure 19:
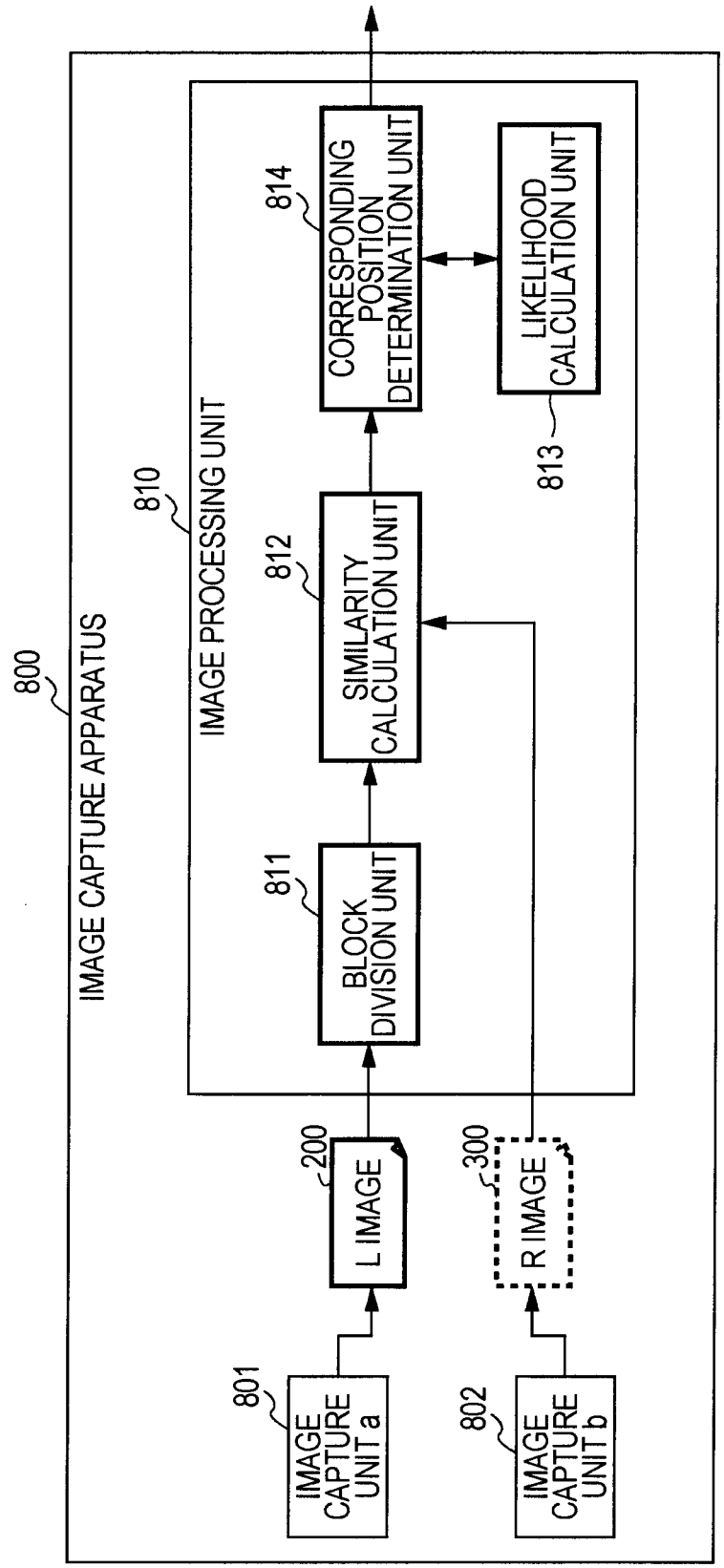
FIG. 19 is a diagram illustrating an example configuration of an image capture apparatus according to an exemplary embodiment of the present invention.

While exemplary embodiments of an image processing apparatuses have been described using the first exemplary embodiment (FIG. 1) and the second exemplary embodiment (FIG. 17), an image capture apparatus can be configured such that the image processing apparatuses according to the foregoing exemplary embodiments are provided with an image capture unit. For example, as illustrated in FIG. 19, an image capture apparatus 800 includes an image capture unit a 801, an image capture unit b 802, and an image processing unit 810.

The image capture unit a 801 photographs an L image 200, and the image capture unit b 802 photographs an R image 300. The L image 200 and the R image 300 are input to the image processing unit 810. Like the image processing apparatus 100 described with reference to FIG. 1, the image processing unit 810 includes a block division unit 811, a similarity calculation unit 812, a likelihood calculation unit 813, and a corresponding position determination unit 814, and performs a process similar to that in the first exemplary embodiment described above.

The image capture units 801 and 802 of the image capture apparatus 800 illustrated in FIG. 19 can have, for example, the configuration described with reference to FIG. 2, and the L image 200 and the R image 300 can be photographed from two different points of view using a single image capture apparatus.

Further, the image processing unit 810 illustrated in FIG. 19 may be replaced by the image processing apparatus 700 described with reference to FIG. 17. That is, the image processing unit 810 may be configured to generate size-reduced images, determine candidate corresponding positions from results of the process performed on the size-reduced images, and execute a hierarchal process.

While specific exemplary embodiments of the present invention have been described in detail, it is to be understood that modifications or alternatives to the exemplary embodiment can be made by a person skilled in the art without departing from the scope of the present invention. That is, embodiments of the present invention have been disclosed in illustrative form, and are not to be construed as limiting the present invention. The scope of the present invention should be determined with reference to the appended claims.

The series of processes described herein may be executed by hardware, software, or a combination of the two. When the processes are executed by software, a program containing a process sequence can be installed into a memory in a computer incorporated in dedicated hardware before being executed, or the program can be installed into a general-purpose computer capable of executing various processes before being executed. For example, the program can be recorded in advance on a recording medium. In addition to the program being installed into a computer from the recording medium, the program can also be received via a network such as a local area network (LAN) or the Internet and installed into a recording medium such as a built-in hard disk.

Various processes described herein may be executed sequentially in the order stated herein or may be executed in parallel or individually in accordance with the processing capabilities of the apparatus that executes the processes or as appropriate. Further, The term "system", as used herein, refers to a logical set of apparatuses regardless of whether or not apparatuses having individual structures are housed in a single housing.

The present application contains subject matter related to that disclosed in Japanese Priority Patent Application JP 2009-176085 filed in the Japan Patent Office on Jul. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a block division unit configured to perform a block division process on a first image selected from the first image and a second image, the first image and the second image being images photographed from different points of view;
a similarity calculation unit configured to calculate similarities between blocks in the first image that are defined by the block division unit and image regions that form the second image;
a likelihood calculation unit configured to calculate likelihoods of each candidate corresponding image region in the second image with respect to individual sets of adjacent blocks in the first image, the calculation being based on a positional relationship of the candidate corresponding image region; and
a corresponding position determination unit configured to determine evaluation values of each candidate corresponding image region in the second image with respect to the blocks in the first image using similarities calculated by the similarity calculation unit and likelihoods calculated by the likelihood calculation unit and to determine image regions in the second image that correspond to the blocks in the first image by comparing the determined evaluation values.

2. The image processing apparatus according to claim 1, further comprising an image size reduction unit configured to reduce a size of the first image and a size of the second image to generate a first size-reduced image and a second size-reduced image,
wherein the block division unit, the similarity calculation unit, the likelihood calculation unit, and the corresponding position determination unit execute a process on the first size-reduced image and the second size-reduced image generated by the image size reduction unit to determine corresponding image regions in the second size-reduced image that correspond to blocks in the first size-reduced image, and
wherein when the block division unit, the similarity calculation unit, the likelihood calculation unit, and the corresponding position determination unit execute a process on the first image and the second image that have not been reduced in size to determine corresponding image regions in the second image that correspond to the blocks in the first image, the corresponding position determination unit executes a process for setting only a corresponding image region in the second image that is not reduced in size, which corresponds to a corresponding image region determined for the second size-reduced image, as a candidate corresponding image region for which an evaluation value is calculated.

3. The image processing apparatus according to claim 2, wherein the image size reduction unit generates size-reduced images having different reduction ratios,
   wherein the block division unit, the similarity calculation unit, the likelihood calculation unit, and the corresponding position determination unit execute a process as a preceding image process on a size-reduced image having a high reduction ratio, and execute a process as a subsequent image process on a size-reduced image having a low reduction ratio or on an image that is not reduced in size, and
   wherein in the subsequent image process, a process for defining a candidate corresponding image region for which an evaluation value is calculated is performed based on a corresponding image region in the second size-reduced image that is determined in the preceding image process, the second size-reduced image having a high reduction ratio.

4. The image processing apparatus according to claim 2 or 3, wherein the block division unit performs a block division process on the size-reduced images to divide the size-reduced images into blocks using block sizes that are reduced at a reduction ratio that is identical to the reduction ratios of the size-reduced images.

5. The image processing apparatus according to claim 4, wherein the likelihood calculation unit calculates likelihoods of a first candidate image region and a second candidate image region in the second image with respect to a first block and a second block included in adjacent blocks in the first image, respectively, by
   setting the likelihoods so that the likelihoods are reduced in accordance with an increase in distance between the first candidate image region and the second candidate image region in the second image when the first candidate image region and the second candidate image region are apart from each other, and
   setting the likelihoods so that the likelihoods are reduced in accordance with an increase in overlap between the first candidate image region and the second candidate image region in the second image when the first candidate image region and the second candidate image region overlap.

6. The image processing apparatus according to claim 5, wherein the corresponding position determination unit calculates an evaluation value X using a similarity F calculated by the similarity calculation unit and a likelihood H calculated by the likelihood calculation unit in accordance with an expression $$X=F+\lambda H,$$

where $\lambda$ denotes a predetermined coefficient.

7. The image processing apparatus according to claim 6, wherein the corresponding position determination unit calculates an evaluation value for a set of a plurality of blocks defined in the first image using the expression, and determines a corresponding image region in the second image that corresponds to the set of the plurality of blocks defined in the first image using the calculated evaluation value.

8. The image processing apparatus according to claim 7, wherein the corresponding position determination unit determines corresponding image regions in the second image that correspond to the blocks in the first image by comparing the evaluation values, by using dynamic programming.

9. An image capture apparatus comprising the image processing apparatus according to claim 8.

10. The image processing apparatus according to claim 1, wherein the likelihood calculation unit calculates likelihoods of a first candidate image region and a second candidate image region in the second image with respect to a first block and a second block included in adjacent blocks in the first image, respectively, by
   setting the likelihoods so that the likelihoods are reduced in accordance with an increase in distance between the first candidate image region and the second candidate image region in the second image when the first candidate image region and the second candidate image region are apart from each other, and
   setting the likelihoods so that the likelihoods are reduced in accordance with an increase in overlap between the first candidate image region and the second candidate image region in the second image when the first candidate image region and the second candidate image region overlap.

11. The image processing apparatus according to claim 1, wherein the corresponding position determination unit calculates an evaluation value X using a similarity F calculated by the similarity calculation unit and a likelihood H calculated by the likelihood calculation unit in accordance with an expression $$X=F+\lambda H,$$

where $\lambda$ denotes a predetermined coefficient.

12. The image processing apparatus according to claim 1, wherein the corresponding position determination unit determines corresponding image regions in the second image that correspond to the blocks in the first image by comparing the evaluation values, by using dynamic programming.

13. An image capture apparatus comprising the image processing apparatus according to according to claim 1.

14. An image processing method executed in an image processing apparatus, comprising the steps of:
   performing, by a block division unit, a block division process on a first image selected from the first image and a second image, the first image and the second image being images photographed from different points of view;
   calculating, by a similarity calculation unit, similarities between blocks in the first image that are defined in the step of performing a block division process and image regions that form the second image;
   calculating, by a likelihood calculation unit, likelihoods of each candidate corresponding image region in the second image with respect to individual sets of adjacent blocks in the first image, the calculation being based on a positional relationship of the candidate corresponding image region; and
   determining, by a corresponding position determination unit, evaluation values of each candidate corresponding image region in the second image with respect to the blocks in the first image using similarities calculated by the similarity calculation unit and likelihoods calculated by the likelihood calculation unit, and determining image regions in the second image that correspond to the blocks in the first image by comparing the determined evaluation values.

15. A non-transitory computer-readable medium storing a program for causing an image processing apparatus to execute an image process, wherein the image process comprises the steps of:

causing a block division unit to perform a block division process on a first image selected from the first image and a second image, the first image and the second image being images photographed from different points of view;

causing a similarity calculation unit to calculate similarities between blocks in the first image that are defined in the step of causing the block division unit to perform a block division process and image regions that form the second image;

causing a likelihood calculation unit to calculate likelihoods of each candidate corresponding image region in the second image with respect to individual sets of adjacent blocks in the first image, the calculation being based on a positional relationship of the candidate corresponding image region; and causing a corresponding position determination unit to determine evaluation values of each candidate corresponding image region in the second image with respect to the blocks in the first image using similarities calculated by the similarity calculation unit and likelihoods calculated by the likelihood calculation unit and to determine image regions in the second image that correspond to the blocks in the first image by comparing the determined evaluation values.

* * * * *